(12) United States Patent
Hayasaka et al.

(10) Patent No.: US 9,600,859 B2
(45) Date of Patent: Mar. 21, 2017

(54) IMAGE PROCESSING DEVICE, IMAGE PROCESSING METHOD, AND INFORMATION PROCESSING DEVICE

(71) Applicant: Sony Corporation, Tokyo (JP)

(72) Inventors: Kengo Hayasaka, Kanagawa (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 14/422,956

(22) PCT Filed: Aug. 16, 2013

(86) PCT No.: PCT/JP2013/072021
§ 371 (c)(1),
(2) Date: Feb. 20, 2015

(87) PCT Pub. No.: WO2014/034444
PCT Pub. Date: Mar. 6, 2014

(65) Prior Publication Data
US 2015/0248744 A1 Sep. 3, 2015

(30) Foreign Application Priority Data
Aug. 31, 2012 (JP) .................................. 2012-191161

(51) Int. Cl.
*G06T 3/40* (2006.01)
*G06T 7/00* (2006.01)
*H04N 13/00* (2006.01)

(52) U.S. Cl.
CPC .......... *G06T 3/4053* (2013.01); *G06T 3/4007* (2013.01); *G06T 7/0022* (2013.01);
(Continued)

(58) Field of Classification Search
CPC ... G06T 3/4007; G06T 3/4053; G06T 7/0051; G06T 7/0022; H04N 13/0029
See application file for complete search history.

(56) References Cited

U.S. PATENT DOCUMENTS 6,269,175 B1 * 7/2001 Hanna ....................... G06T 5/50
  348/E13.014
6,490,364 B2 * 12/2002 Hanna ....................... G06T 5/50
  348/E13.014
(Continued)

FOREIGN PATENT DOCUMENTS

CN   101312539 A   11/2008
JP   10-134187    5/1998
(Continued)

OTHER PUBLICATIONS

International Search Report issued in connection with International Patent Application No. PCT/JP2013/072021, dated Oct. 22, 2013. (2 pages).

(Continued)

*Primary Examiner* — Utpal Shah
(74) *Attorney, Agent, or Firm* — Chip Law Group

(57) ABSTRACT

An image processing device in which a high-resolution viewpoint image and a disparity map is obtained with a simple configuration. A resolution of a viewpoint image imaged at a central viewpoint at first resolution is converted to a resolution of a viewpoint image imaged at a peripheral viewpoint at second resolution which is lower than the first resolution, and the viewpoint image at the central viewpoint and the viewpoint image at the peripheral viewpoint both having a same resolution are generated. Further, a disparity map based on a correlation value between the viewpoint image at the central viewpoint and the viewpoint image at the peripheral viewpoint both having the same resolution is generated.

9 Claims, 29 Drawing Sheets

(52) U.S. Cl.
CPC ....... *G06T 7/0051* (2013.01); *H04N 13/0029* (2013.01); *G06T 2207/10052* (2013.01); *G06T 2207/20228* (2013.01); *H04N 2013/0081* (2013.01)

(56) References Cited

U.S. PATENT DOCUMENTS

| | | | |
|---|---|---|---|
| 6,847,392 B1 | 1/2005 | House | |
| 8,509,558 B2* | 8/2013 | Ma | G06T 7/0065 348/239 |
| 9,030,530 B2* | 5/2015 | Izzat | G06T 7/0022 348/47 |
| 2003/0190072 A1* | 10/2003 | Adkins | G06T 5/50 382/154 |
| 2004/0105579 A1 | 6/2004 | Ishii et al. | |
| 2010/0271511 A1* | 10/2010 | Ma | G06T 7/0065 348/239 |
| 2011/0128394 A1* | 6/2011 | Narayanan | G06T 3/4076 348/222.1 |
| 2011/0199458 A1 | 8/2011 | Hayasaka et al. | |
| 2012/0039525 A1* | 2/2012 | Tian | G06T 5/005 382/154 |
| 2012/0249750 A1* | 10/2012 | Izzat | G06T 7/0022 348/47 |
| 2012/0327189 A1* | 12/2012 | Muramatsu | G01C 3/06 348/46 |
| 2013/0101263 A1 | 4/2013 | Morioka et al. | |

FOREIGN PATENT DOCUMENTS

| | | |
|---|---|---|
| JP | 2000-102040 | 4/2000 |
| JP | 2002-359838 | 12/2002 |
| JP | 2009-165115 | 7/2009 |
| JP | 2011-171858 | 9/2011 |
| JP | WO 2011111247 A1 * 9/2011 ............... G01C 3/06 |
| WO | 2012/029301 | 3/2012 |
| WO | 2012/111755 | 8/2012 |

OTHER PUBLICATIONS

Office Action reveived for Chines Patent Application No. 201380044211.9, mailed on Apr. 26, 2016, 16 pages of Office Action including 8 pages of English Translation.

* cited by examiner

IMAGE PROCESSING DEVICE, IMAGE PROCESSING METHOD, AND INFORMATION PROCESSING DEVICE

CROSS REFERENCES TO RELATED APPLICATIONS

The present application is a national stage of International Application No. PCT/JP2013/072021 filed on Aug. 16, 2013 and claims priority to Japanese Patent Application No. 2012-191161 filed on Aug. 31, 2012, the disclosure of which is incorporated herein by reference.

BACKGROUND

The present technology relates to an image processing device, an image processing method, and an information processing device, and particularly relates to the image processing device, image processing method, and information processing device, in which a high-resolution viewpoint image and a disparity map can be obtained with a simple configuration.

There is a known technology in which a distance to a measurement target (an object) is measured by a plurality of images having different viewpoints. For instance, a distance calculation method using a technique called stereo matching is disclosed in Patent Document 1.

According to such a technique of stereo matching, in the case of calculating a distance based on plural viewpoint images along a horizontal direction (H-direction) or a vertical direction (V-direction) inside an image, a phase difference between the viewpoint images is obtained as a value corresponding to the distance. The phase difference is obtained by sequentially moving a local area (unit area) to be compared in the horizontal direction, and detecting a positional displacement (pixel displacement, disparity) between the viewpoint images of the unit areas which have the highest correlation within a comparison range. The positional displacement can be calculated from the plural viewpoint images along a certain angle direction inside the image. Further, disparity can be measured per pixel, and therefore, a disparity distribution map (disparity map) can be obtained equal to resolution of an input image.

CITATION LIST

Patent Document

Patent Document 1: JP 2011-171858 A

SUMMARY

Problems to be Solved by the Invention

However, the disparity is not always highly accurate because the disparity is merely distance information. Therefore, the viewpoint image at a predetermined viewpoint generally used as a photograph is needed to be a high resolution, but the viewpoint image used only for generating the disparity is not needed to be the high resolution.

The present technology is made in view of the above-described situation and directed to obtaining a high-resolution viewpoint image and a disparity map with a simple configuration.

Solutions to Problems

An image processing device according to a first aspect of the present technology is an image processing device including: a resolution conversion unit configured to convert a resolution of one viewpoint image out of a first viewpoint image imaged at a first resolution and a second viewpoint image imaged at a second resolution which is lower than the first resolution to the resolution of the other viewpoint image, and generate the first viewpoint image and the second viewpoint image both having a same resolution; and a generation unit configured to generate a disparity map based on a correlation value between the first viewpoint image and the second viewpoint image both having the same resolution and generated by the resolution conversion unit.

An image processing method according to a first aspect of the present technology corresponds to the image processing device according to the first aspect of the present technology.

According to the first aspect of the present technology, the resolution of one viewpoint image out of the first viewpoint image imaged at the first resolution and the second viewpoint image imaged at the second resolution which is lower than the first resolution is converted to the resolution of the other viewpoint image, and the first viewpoint image and the second viewpoint image both having the same resolution are generated, and further the disparity map is generated based on the correlation value between the first viewpoint image and the second viewpoint image both having the same resolution.

An information processing device according to a second aspect of the present technology is an information processing device including: an imaging unit including a first imaging element configured to image a first viewpoint image having a first resolution, and a second imaging element configured to image a second viewpoint image having a second resolution which is lower than the first resolution; a resolution conversion unit configured to convert a resolution of one viewpoint image out of the first viewpoint image imaged by the first imaging element and the second viewpoint image imaged by the second imaging element to the resolution of the other viewpoint image, and generate the first viewpoint image and the second viewpoint image both having a same resolution; and a generation unit configured to generate a disparity map based on a correlation value between the first viewpoint image and the second viewpoint image both having the same resolution and generated by the resolution conversion unit.

According to the second aspect of the present technology, the first imaging element configured to image the first viewpoint image having the first resolution, and the second imaging element configured to image the second viewpoint image having the second resolution which is lower than the first resolution are provided, the resolution of one viewpoint image out of the first viewpoint image imaged by the first imaging element and the second viewpoint image imaged by the second imaging element is converted to the resolution of the other viewpoint image, and the first viewpoint image and the second viewpoint image both having the same resolution are generated, and further, the disparity map is generated based on the correlation value between the first viewpoint image and the second viewpoint image both having the same resolution.

SUMMARY OF THE INVENTION

According to the present technology, the high-resolution viewpoint image and a disparity map can be obtained with a simple configuration.

Additional features and advantages are described herein, and will be apparent from the following Detailed Description and the figures.

DETAILED DESCRIPTION

In the following, embodiments according to the present technology will be described with reference to the drawings.

First Embodiment

Figure 1:
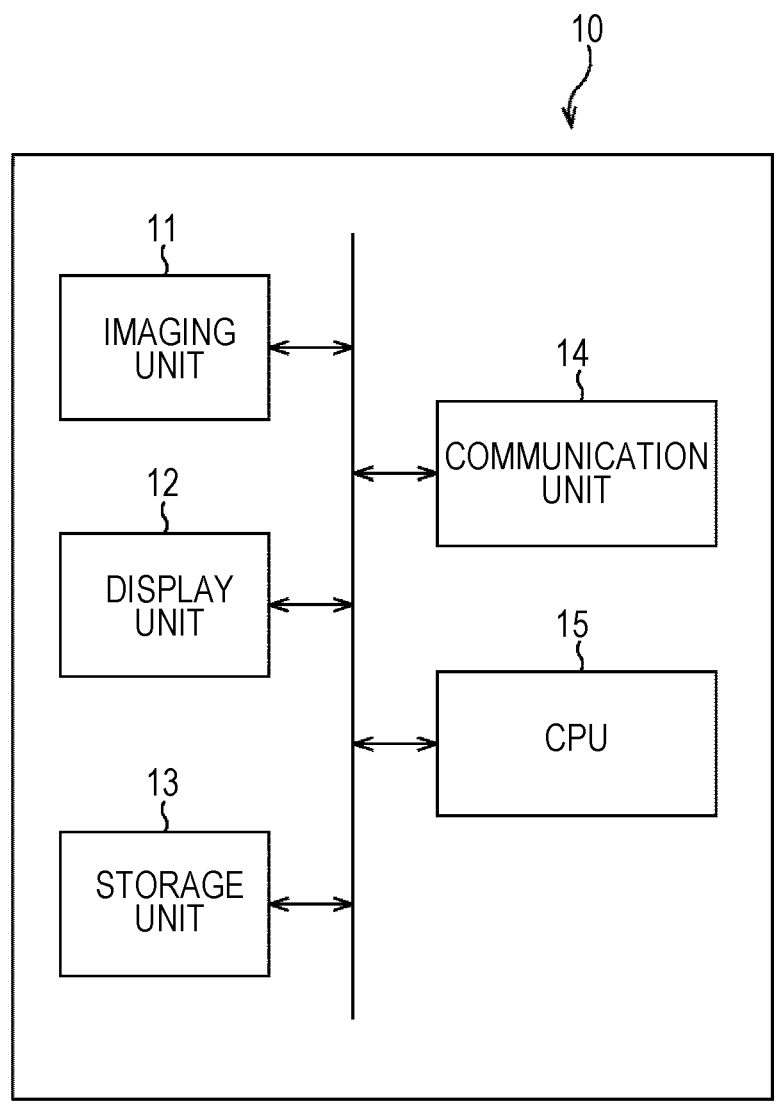
FIG. 1 is a block diagram illustrating an exemplary hardware configuration of an information processing device according to an embodiment to which the present technology is applied.

Exemplary Hardware Configuration of Information Processing Device According to One Embodiment FIG. 1 is a block diagram illustrating an exemplary hardware configuration according to an embodiment of an information processing device to which the present technology is applied.

An information processing device 10 includes an imaging unit 11, a display unit 12, a storage unit 13, a communication unit 14, and a CPU 15.

The imaging unit 11 photographs a still image and a moving image. Particularly, according to the present embodiment, the imaging unit 11 is formed of a camera array capable of capturing a plurality of viewpoint images of an object. The imaging unit 11 images a viewpoint image at a central viewpoint at a high resolution among the plurality of viewpoint images, and images a viewpoint image at a low resolution at a peripheral viewpoint which is a viewpoint other than central viewpoint.

The display unit 12 is a display device using, for example, an LCD (Liquid Crystal Display), an OELD (Organic Electro-Luminescence Display), a CRT (Cathode Ray Tube), etc. The display unit 12 is used to, for example, display an object preview image generated based on the plurality of viewpoint images captured at the imaging unit 11, set a development parameter necessary for development processing, and display a final object image generated by arithmetic processing in the CPU 15.

The storage unit 13 is a non-volatile memory such as an HDD (Hard Disk Drive), a flash memory (SSD (Solid State Drive), and other solid-state memories. The storage unit 13 stores the plurality of viewpoint images captured by the imaging unit 11, a plurality of development parameters, an interpolation image and a final image generated by the arithmetic processing in the CPU 15, various kinds of programs, and so on. The development parameters stored in the storage unit 13 may be downloaded via the communication unit 14, and also may be read from a memory card mounted on a slot not illustrated.

The communication unit 14 is configured to be able to communicate with a server device on a network not illustrated and an external network terminal.

The CPU 15 executes a program stored in the storage unit 13, thereby controlling operation of the imaging unit 11, display unit 12, storage unit 13, and communication unit 14.

More specifically, the CPU 15 functions as an image processing unit or the like that is configured to generate a plurality of interpolation images for interpolating the plurality of viewpoint images based on the plurality of viewpoint images, and develop an object image in accordance with a development parameter selected by a user by using the interpolation images and viewpoint images.

(Exemplary Configuration of Imaging Unit)

Figure 2:
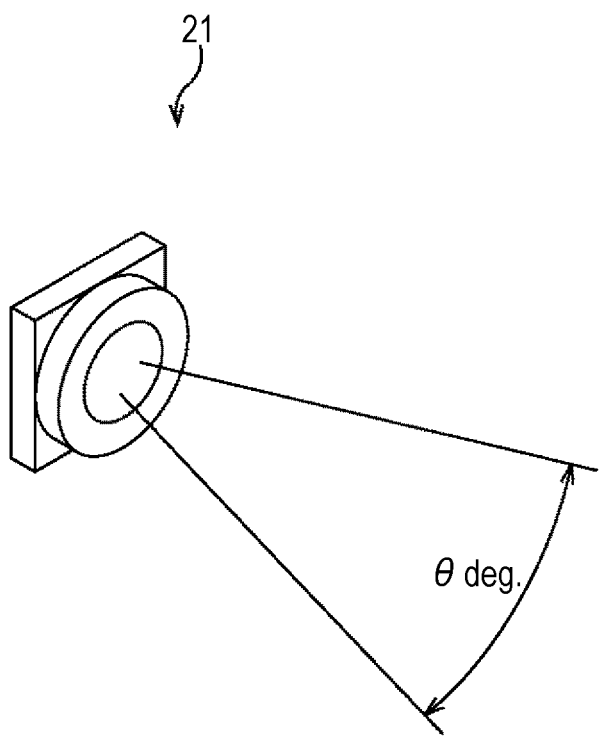
FIG. 2 is a schematic perspective view illustrating an exemplary configuration of a camera module constituting an imaging unit.

The imaging unit 11 is formed of the camera array (multi-view camera) in which a plurality of camera modules is arrayed in a matrix on a same plane. FIG. 2 is a schematic perspective view illustrating an exemplary configuration of a camera module 21 constituting the imaging unit 11, and FIG. 3 is a schematic perspective view of the imaging unit 11.

The camera module 21 is formed of a solid-state image sensing device such as a CMOS (Complementary Metal Oxide Semiconductor) and a CCD (Charge Coupled Device) sensor.

Figure 3:
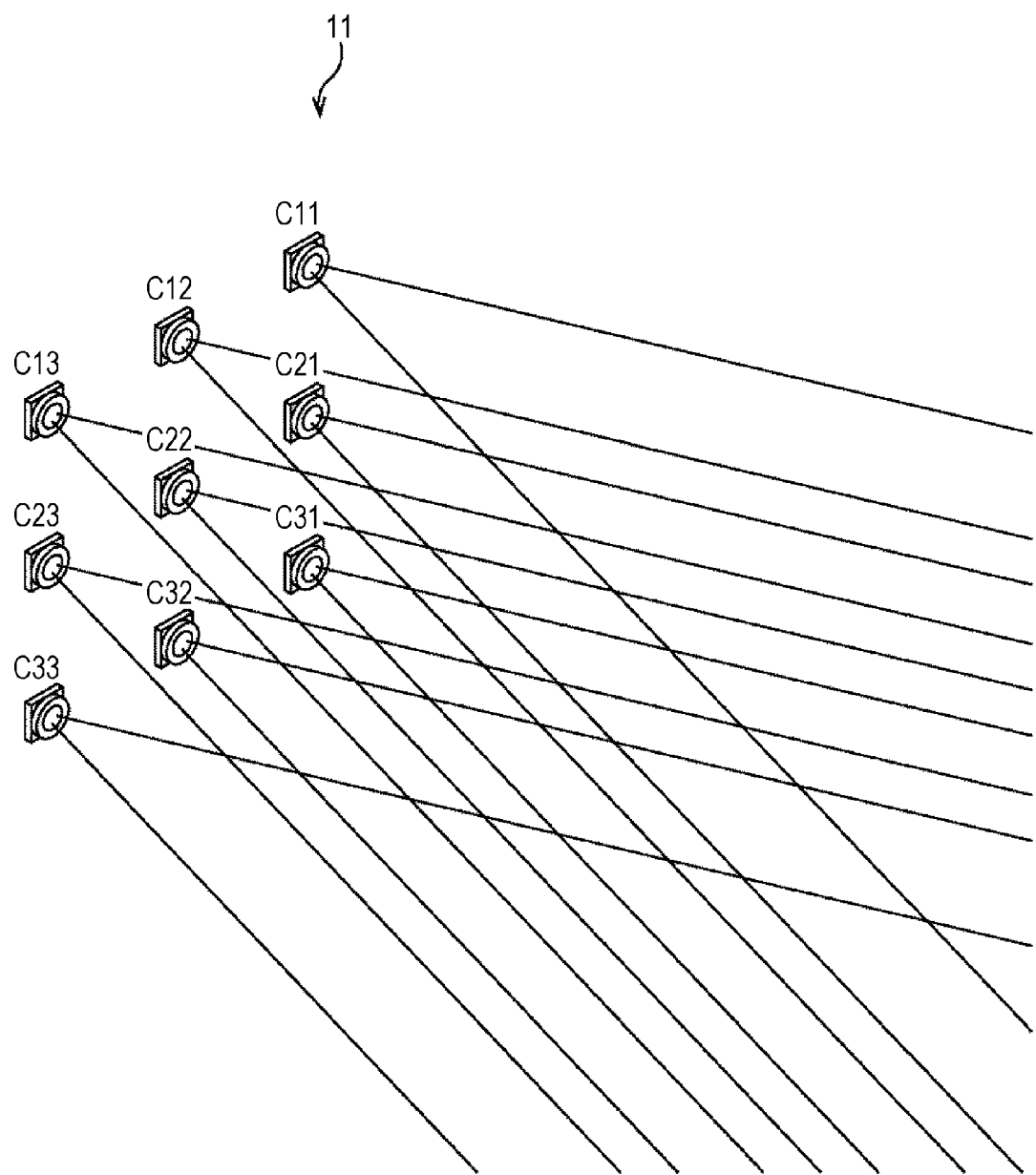
FIG. 3 is a schematic perspective view of the imaging unit.

In FIG. 3, an example in which 3 (rows)×3 (columns) of the camera modules 21 having a field angle of θ degrees are arrayed on the same plane is illustrated, but the array and the number of the camera modules 21 are obviously not limited thereto. For instance, the camera module 21 for the peripheral viewpoint may be arrayed at corners of an octagon centering the camera module at the central viewpoint.

In the following description, three camera modules 21 out of nine camera modules 21, which are arrayed in the first row from the top, are referred to as camera modules C11, C12, C13 in the order from the object's left. In the same manner, three camera modules in the second row from the top are referred to as C21, C22, C23 in the order from the object's left. The three camera modules in the third row from the top are referred to as C31, C32, C33 in the order from the object's left.

The imaging unit 11 captures a viewpoint image of the object corresponding to each of the positions (viewpoints) of the plurality of camera modules 21 by simultaneously photographing the object with each of the camera modules 21. The viewpoint image obtained is used in the image processing unit 30 or stored in the storage unit 13.

Figure 4:
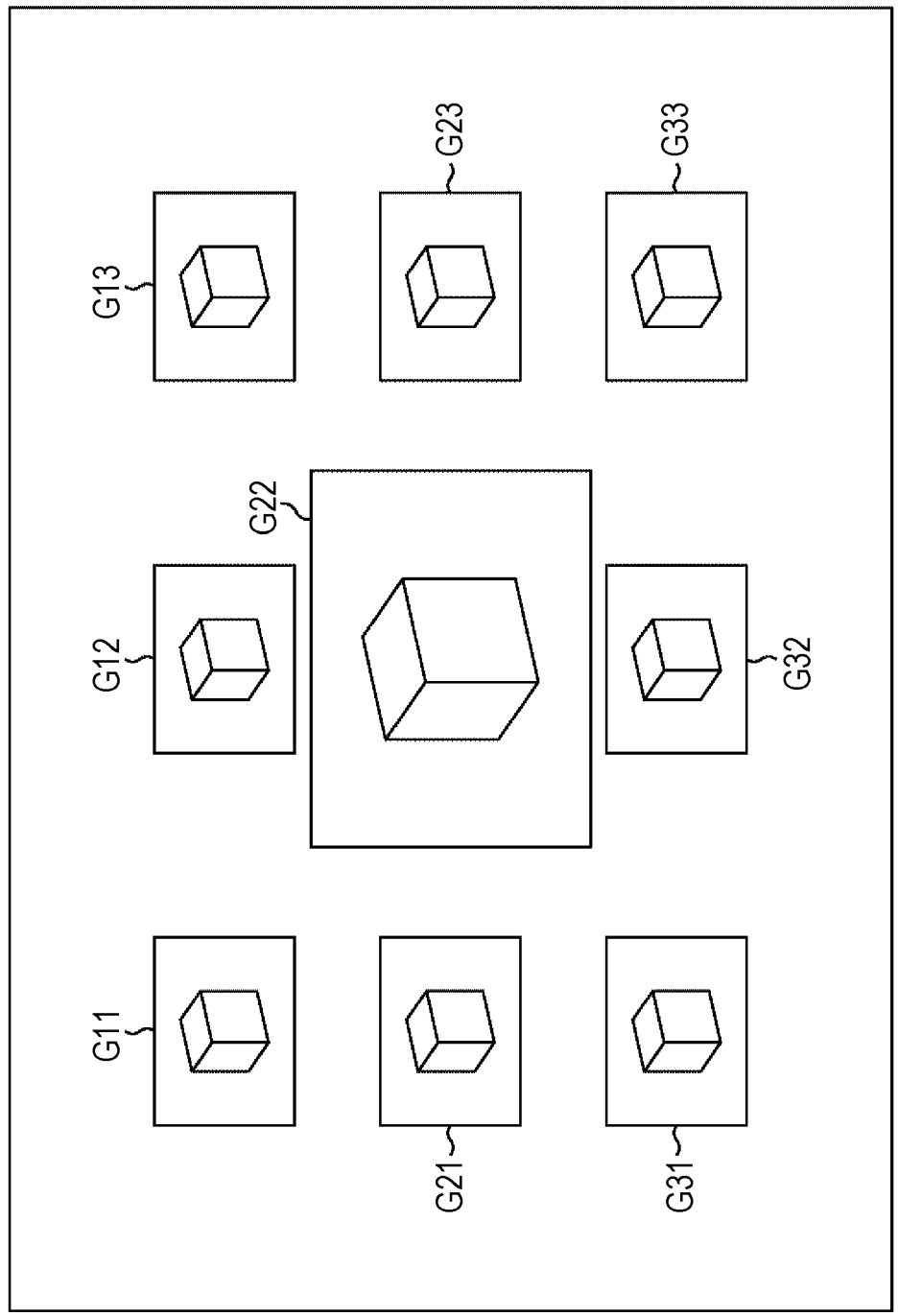
FIG. 4 is a diagram illustrating an example of an imaged viewpoint image.

Note that the camera module C22 placed at the center is formed of a camera module having a resolution higher than the camera modules C11 to C13, C21, C23, and C31 to C33 place around thereof. Therefore, as illustrated in FIG. 4, the resolution of a viewpoint image G22 at the central viewpoint captured by the camera module C22 is higher compared to resolutions of viewpoint images G11 to G13, G21, G23, and G31 to G33 at the peripheral viewpoints imaged by the camera modules C11 to C13, C21, C23, and C31 to C33.

The camera module C22 having a first resolution R1 is mainly used to capture a high-resolution viewpoint image of the object, and the camera modules C11 to C13, C21, C23, and C31 to C33 having a second resolution R2 are used to obtain a disparity map only.

In the present specification, the camera module C22 has the first resolution R1, and the other peripheral camera modules C11 to C13, C21, C23, and C31 to C33 respectively have the second resolutions R2 lower than the first resolution. The values of the first resolution R1 and the second resolution R2 are not particularly limited and can be set to suitable values by which the final image and disparity map having an intended resolution can be obtained.

(First Exemplary Configuration of Image Processing Unit)

Figure 5:
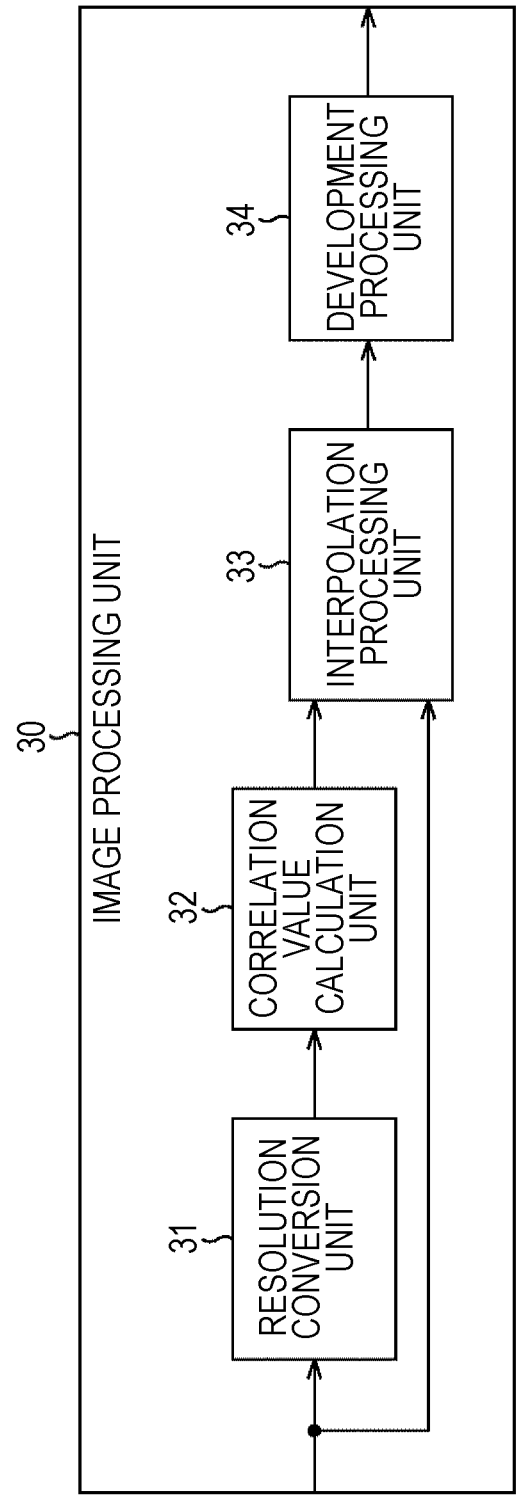
FIG. 5 is a block diagram illustrating a first exemplary configuration of an image processing unit.

FIG. 5 is a block diagram illustrating a first exemplary configuration of the image processing unit implemented by the CPU 15.

The image processing unit 30 in FIG. 5 includes a resolution conversion unit 31, a correlation value calculation unit 32, an interpolation processing unit 33, and a development processing unit 34.

The resolution conversion unit 31 in the information processing device 10 converts, to the second resolution R2, the resolution of the viewpoint image having the first resolution R1 at the central viewpoint among the plurality of viewpoint images imaged by the imaging unit 11 in FIG. 1. The resolution conversion unit 31 supplies the correlation value calculation unit 32 with the viewpoint image having the second resolution R2 at the central viewpoint obtained as a result thereof and the viewpoint images at the peripheral viewpoints.

The correlation value calculation unit 32 functions as a generation unit, and executes stereo matching processing per pixel having the second resolution R2 by using the viewpoint image having the second resolution R2 at the central viewpoint and the viewpoint images at the peripheral viewpoints supplied from the resolution conversion unit 31. Then, the correlation value calculation unit 32 detects, per pixel having the second resolution R2, a distance between local areas inside the viewpoint images at the central viewpoint and the peripheral viewpoints when a correlation value obtained from the stereo matching processing shows the highest correlation.

The correlation value calculation unit 32 generates a phase difference map (disparity map) having the second resolution R2 by setting the detected distance (phase difference) of each pixel having the second resolution R2 as a pixel value. The correlation value calculation unit 32 converts the resolution of the disparity map having the second resolution R2 to the first resolution R1, and supplies the same to the interpolation processing unit 33. Note that, in the following, the pixel value of the disparity map will be referred to as a disparity value in order to differentiate from the pixel value of the viewpoint image.

The interpolation processing unit 33 interpolates the viewpoint image having the first resolution R1 at a viewpoint between the central viewpoint and the peripheral viewpoints, and also generates a viewpoint image having the first resolution R1 at the peripheral viewpoints by using the disparity map from the correlation value calculation unit 32 and the viewpoint images from the imaging unit 11. The interpolation processing unit 33 supplies the development processing unit 34 with the viewpoint image having the first resolution R1 at the central viewpoint and the peripheral viewpoints, and the interpolation images.

The development processing unit 34 executes development processing to develop (reconstruct) the object image by using the viewpoint images and the interpolation images from the interpolation processing unit 33 and a development parameter selected by the user from among the plurality of development parameters stored in the storage unit 13. The development processing unit 34 outputs, as the final image, the image having the first resolution R1 generated as a result thereof. The final image may be stored in the storage unit 13 or transmitted to an external device via the communication unit 14.

As described above, the image processing unit 30 executes the stereo matching processing by converting the resolution of the viewpoint image having the first resolution R1 at the central viewpoint to the second resolution R2 which is same as the resolution of the viewpoint images at the peripheral viewpoints. Therefore, the image processing unit 30 can obtain a high-resolution viewpoint image at the central viewpoint and the disparity map even in the case where the resolution of the viewpoint image at the peripheral viewpoint is lower compared to the resolution of the viewpoint image at the central viewpoint.

Accordingly, the information processing device 10 can obtain the high-resolution viewpoint image and disparity map by using the imaging unit 11 having a simple configuration in which the resolution of the camera module 21 at the peripheral viewpoint is lower than the resolution of the camera module 21 at the central viewpoint. As a result, the manufacturing cost can be reduced.

(Processing Flow for Generating Interpolation Image)

Figure 6:
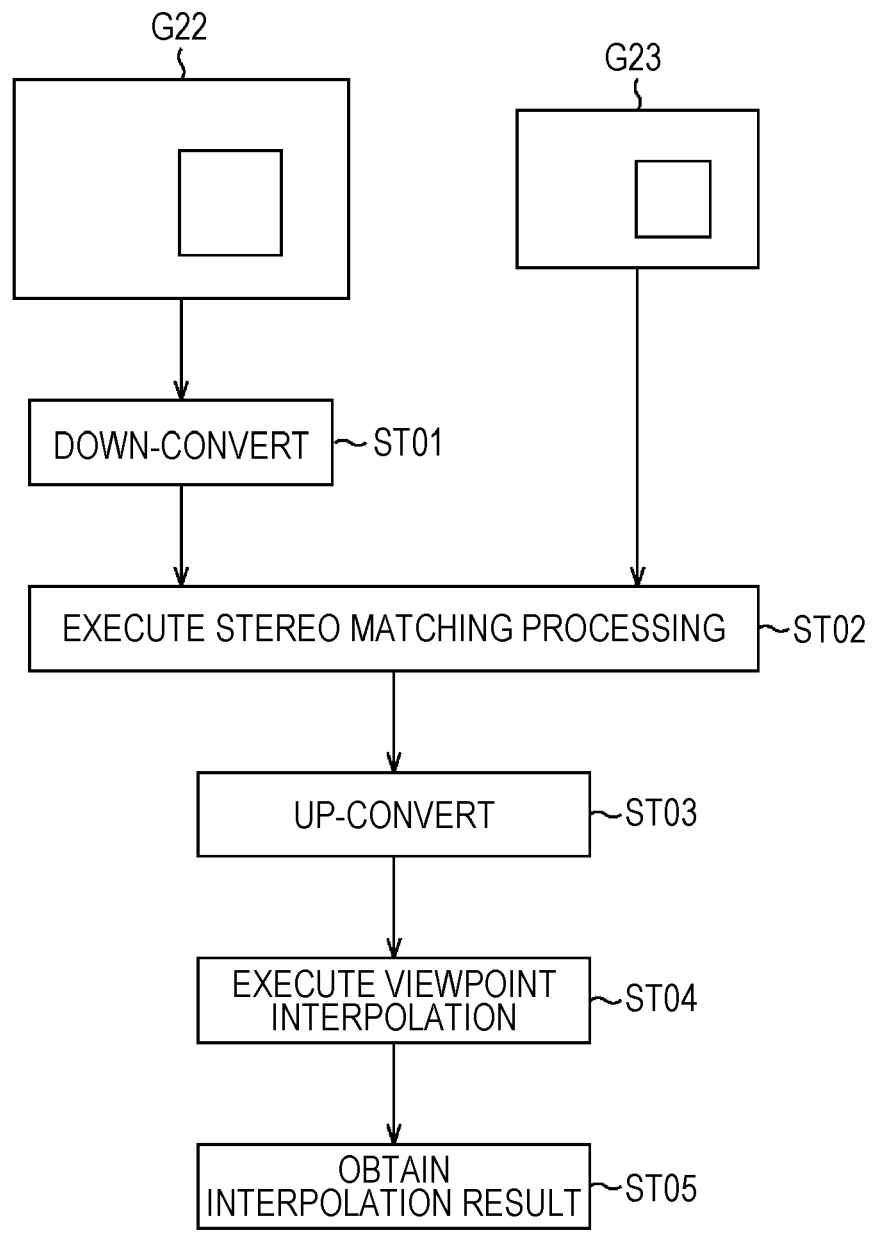
FIG. 6 is a diagram for describing a processing flow to generate an interpolation image in the image processing unit of FIG. 5.

FIG. 6 is a diagram for describing a processing flow to generate the interpolation image in the image processing unit 30 of FIG. 5. The image processing unit 30 calculates correlation values between the viewpoint image G22 at the central viewpoint and each of the viewpoint images G11 to G13, G21, G23, and G31 to G33 at the peripheral viewpoints. Here, a description will be given, as an example, for a case of calculating the correlation value between the viewpoint image G22 and the viewpoint image G23 having disparity only in the horizontal direction.

Figure 7:
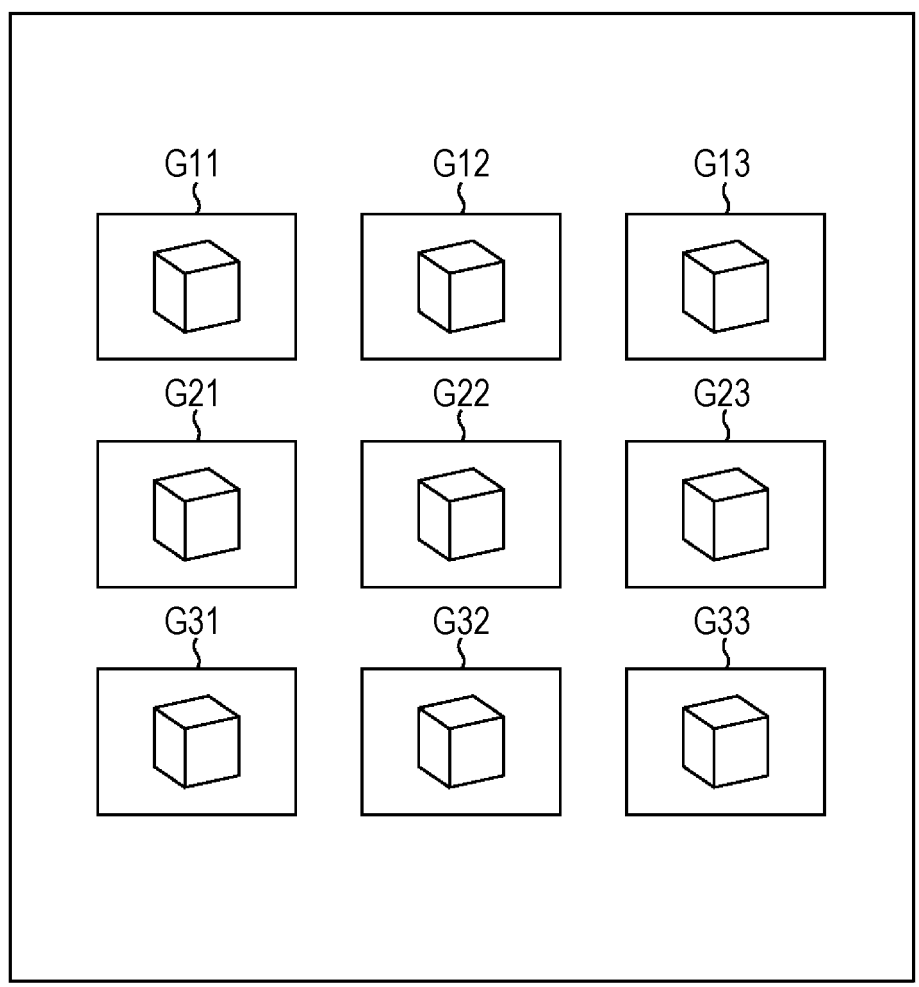
FIG. 7 is a diagram illustrating an exemplary viewpoint image after a resolution is converted by a resolution conversion unit in FIG. 5.

The resolution conversion unit 31 converts (down-converts), to the second resolution R2, the resolution of the viewpoint image G22 imaged by the imaging unit 11 and having the first resolution R1 (step ST01). By this, the resolutions of the viewpoint image G22 and the viewpoint image G23 become same as illustrated in FIG. 7, and therefore, the proper stereo matching processing can be executed.

After converting the resolution, the correlation value calculation unit 32 executes the stereo matching processing to calculate the correlation between the viewpoint image G22 and the viewpoint image G23 both having the second resolution R2, and generates the disparity map having the second resolution R2 (step ST02).

Further, the correlation value calculation unit 32 converts (up-converts) the resolution of the generated disparity map to the first resolution R1 (step ST03). At this point, it is possible to refer to edge information of the viewpoint image G22 having the first resolution R1 before executing the resolution conversion.

Then, the interpolation processing unit 33 refers to the obtained disparity map having the first resolution R1 and the imaged viewpoint image G22 and viewpoint image G23, and generates the viewpoint image G23 having the first resolution R1, and also interpolates the viewpoint image having the first resolution R1 at a viewpoint between the viewpoints of the viewpoint image G22 and viewpoint image G23 (step ST04). By this, the viewpoint image (camera image) G23 having the first resolution R1 can be obtained and also an interpolation image having the first resolution R1, namely, the viewpoint image between the viewpoint image G22 and the viewpoint image G23 can be obtained as a result of interpolation result (step ST05).

Calculation of the correlation value between the viewpoint image G22 and the viewpoint images G11 to G13, G21, and G31 to G33 is executed in the same procedure as described above. By this, the interpolation images having the first resolution R1 are generated between the viewpoint image G21 and the peripheral viewpoint images G11 to G13, G21, and G31 to G33.

(Description for Stereo Matching Processing)

Figure 8:
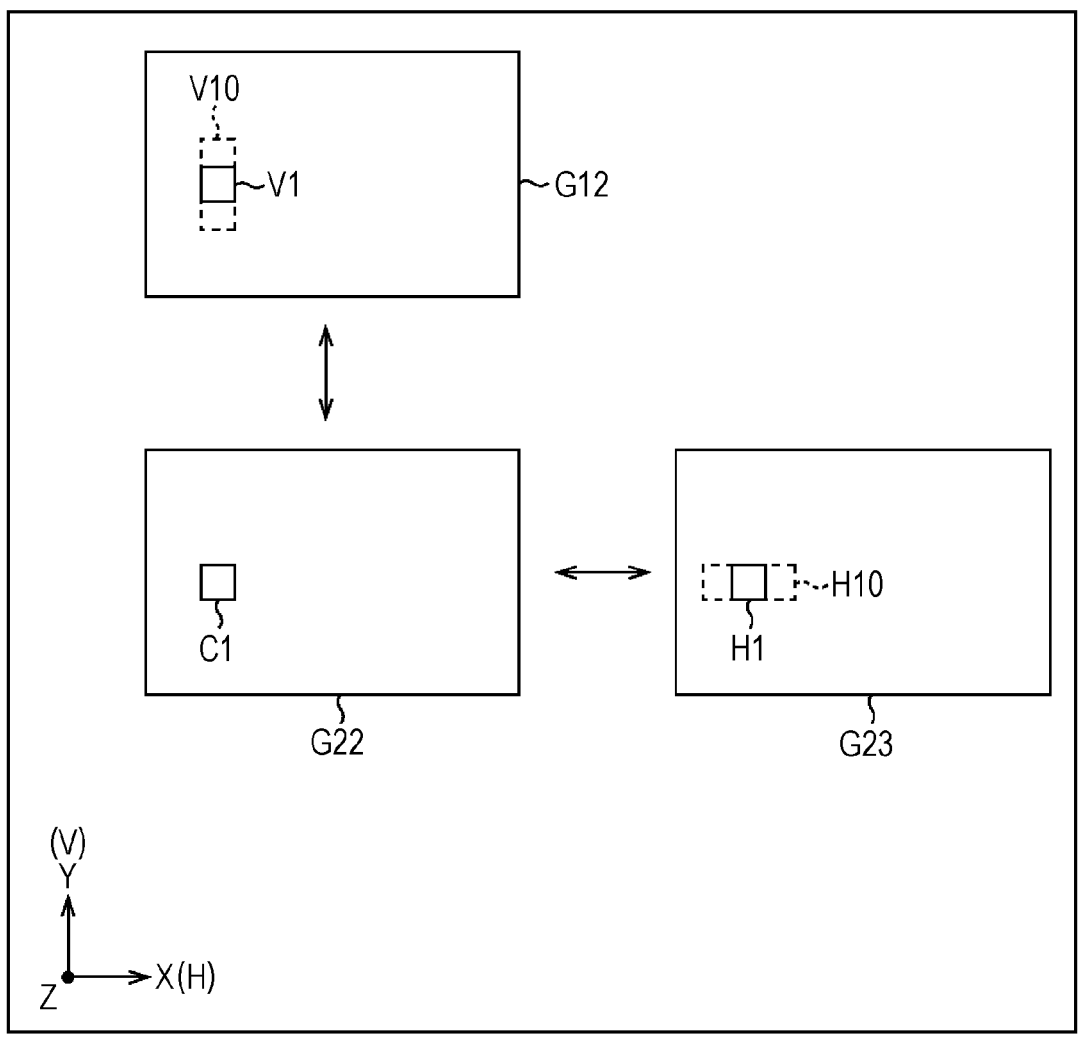
FIG. 8 is a diagram for describing stereo matching processing in FIG. 6.

FIG. 8 is a diagram for describing the stereo matching processing in step ST02 of FIG. 6.

In the stereo matching, the viewpoint image at the central viewpoint is sequentially compared with the images at the respective peripheral viewpoints by the local areas, and the phase differences (disparity) between the viewpoint images are obtained.

For example, as illustrated in FIG. 8, in the case where the viewpoints are aligned in the horizontal (H) direction and the stereo matching processing is executed between the viewpoint image G22 having the disparity in the horizontal direction at the central viewpoint and the viewpoint image G23 at the peripheral viewpoint, the respective pixels of the and viewpoint image G22 and viewpoint image G23 are compared in units of the local area and the correlation value (pixel correlation value) indicating a similarity level between the local areas can be obtained. Then, a phase difference between the local areas when the correlation value shows the highest correlation is set as a disparity value of the pixel corresponding to the local area.

More specifically, the local area inside the viewpoint image G22 (partial image C1: central coordinate (x1, y1) in FIG. 8) is picked out first. Next, the local area inside the viewpoint image G23 to be compared (partial image H1: central coordinate (x1, y1) in FIG. 8) is picked out, and the correlation value is sequentially calculated by sequentially moving a position of a partial image H1 in the horizontal direction within a comparison range H10. Then, positional displacement (pixel displacement) of a partial image C1 and the partial image H1 when the correlation value shows the highest correlation inside the comparison range H10 is obtained as the disparity value of the pixel at the central coordinate (x1, y1).

The correlation value calculation unit 32 executes the above-described processing for a pixel inside an edge region where an edge of the viewpoint image G22 exists, thereby generating the disparity map including the phase difference as the disparity value only in the edge region of the viewpoint image G22. A disparity value of a region other than the edge region of the disparity map is set as a non-detection value indicating that the phase difference is not detected.

Also, as illustrated in FIG. 8, in the case where the viewpoints are aligned in the vertical (V) direction, the stereo matching processing between the viewpoint image G22 having disparity in the vertical direction at the central viewpoint and the viewpoint image G12 at the peripheral viewpoint is executed in the same manner as the stereo matching processing for the viewpoint image G22 and the viewpoint image G23.

More specifically, the partial image C1 inside the viewpoint image G22 and a partial image V1 inside the viewpoint image G12 are respectively picked out first, and then, the correlation value is sequentially calculated by sequentially moving a position of the partial image V1 in the vertical direction within the comparison range V10. The correlation value calculation unit 32 executes the above-described processing for the pixel inside the edge region of the viewpoint image G22, thereby generating the disparity map including the phase difference only in the edge region of the viewpoint image G22. A disparity value in a region other than the edge region of the disparity map is set as the non-detection value.

Thus, the phase differences between the viewpoint images are detected by executing the stereo matching processing using a plurality of viewpoint images, and the disparity map is generated.

Meanwhile, various items can be used as the correlation value in the stereo matching processing; for example, an SAD (Sum of Absolute Difference), an SSD (Sum of Squared Difference), or an NCC (Normalized Cross-Correlation) can be used as the correlation value. In the case where the SAD or SSD is used, the higher the correlation is, the smaller the correlation value is (close to zero), and the lower the correlation is, the larger the correlation value is (close to □). On the other hand, in the case where the NCC is used, the higher the correlation is, the closer to one the correlation value is, and the lower the correlation is, the closer to zero the correlation value is.

(Description for Resolution Conversion for Disparity Map)

Figure 9:
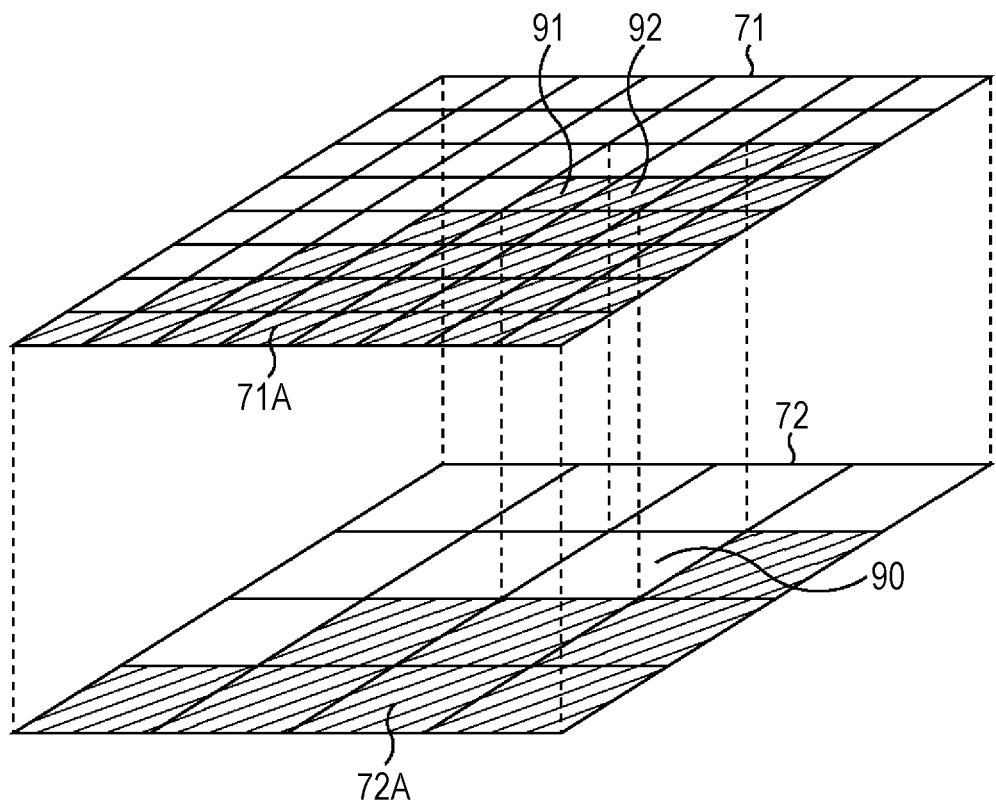
FIG. 9 is a diagram for describing resolution conversion for a disparity map in FIG. 6.
Figure 10:
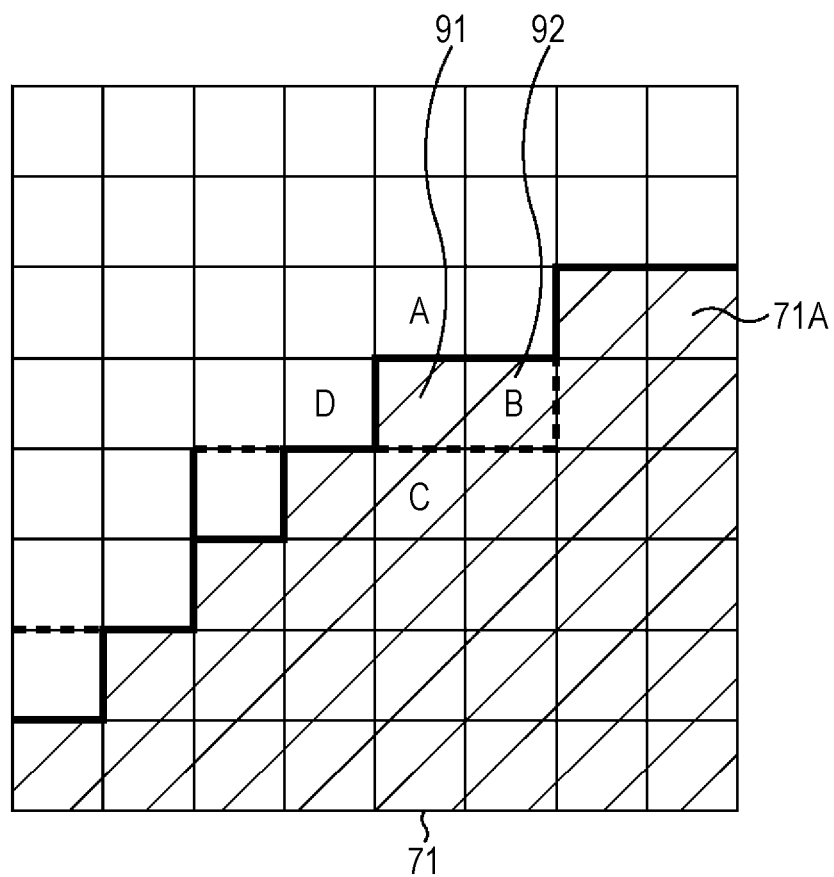
FIG. 10 is a diagram for describing resolution conversion for the disparity map in FIG. 6.

FIGS. 9 and 10 are diagrams for describing resolution conversion for the disparity map in step ST03 in FIG. 6.

In FIGS. 9 and 10, a square represents a pixel. Further, in examples in FIGS. 9 and 10, the first resolution R1 is four times higher than the second resolution R2.

As described above, the disparity map includes the phase difference as the disparity value only inside the edge region of the viewpoint image G22 at the central viewpoint. Therefore, as illustrated in FIG. 9, in the case where an edge region 71A of a viewpoint image 71 which is the viewpoint image G22 having the first resolution R1 is different from an edge region 72A of a viewpoint image 72 which is the viewpoint image G22 having the second resolution R2, the resolution of the disparity map sometimes cannot be converted to the first resolution R1 by simple pixel interpolation.

In other words, the phase difference between a pixel 91 and a pixel 92 of the viewpoint image 71, which is not the edge region 72A of the viewpoint image 72 but is the edge region 71A of the viewpoint image 71, cannot be interpolated by the simple pixel interpolation because the disparity value of a corresponding pixel 90 of the viewpoint image 72 is the non-detection value.

Therefore, the correlation value calculation unit 32 generates the phase difference between the pixel 91 and pixel 92, which is not the edge region 72A of the viewpoint image 72 but is the edge region 71A of the viewpoint image 71, as described below.

First, the correlation value calculation unit 32 obtains a pixel value difference between the pixel 91 and pixels vertically and horizontally adjacent to the pixel 91 (pixels illustrated in squares indicated by A to D in FIG. 10) in the viewpoint image 71. Next, the correlation value calculation unit 32 determines in ascending order of the pixel value difference whether there is any disparity value having the second resolution R2 corresponding to the adjacent pixels, and in the case where there is the one, the disparity value thereof is set as a phase difference of the pixel 91.

On the other hand, in the case where there is no disparity value having the second resolution R2 corresponding to all of the adjacent pixels, the correlation value calculation unit 32 executes the same processing by newly setting, as the adjacent pixels, the pixels vertically and horizontally adjacent to the pixel 92 located next to the pixel 91 on the right side. Thus, the phase difference of the pixel 91 is generated. The same is executed for the phase difference of the pixel 92.

The correlation value calculation unit 32 also generates the phase difference by simply executing pixel interpolation for the disparity map having the second resolution R2 with respect to pixels other than the pixel 91 and pixel 92 inside the edge region 71A of the viewpoint image 71.

As described above, the correlation value calculation unit 32 generates the disparity map having the first resolution R1. The generated disparity map includes the phase difference as the disparity value of the edge region 71A and includes the non-detection value as the disparity value of a region other than the edge region 71A. Further, the correlation value calculation unit 32 interpolates the disparity value of the region other than the edge region 71A based on the disparity value of the edge region 71A of the disparity map having the first resolution R1, and generates a final disparity map having the first resolution R1.

As described above, the correlation value calculation unit 32 can set, on the disparity map having the first resolution R1, the disparity value for the pixel 91 and pixel 92 of which the phase differences has not been not detected in the viewpoint image 72 as a phase difference of the pixels having a similar pixel value. Therefore, the resolution of the disparity map can be converted to the first resolution R1 with high accuracy.

(Description of Viewpoint Interpolation Processing)

Next, the viewpoint interpolation processing in step ST04 of FIG. 6 will be described with reference to FIGS. 11 and 12.

The interpolation processing unit 33 first generates the viewpoint images G11 to G13, G21, G23, and G31 to G33 having the first resolution R1 at the peripheral viewpoints by using the disparity map and the viewpoint images at all of the viewpoints.

More specifically, the interpolation processing unit 33 moves, per pixel, the pixel value of the viewpoint image G22 by an amount of a disparity value of the disparity map related to each of the peripheral viewpoints and a reference viewpoint. Then, the interpolation processing unit 33 compares, per pixel having the first resolution R1, the moved pixel value of the viewpoint image G22 with a pixel value of the corresponding viewpoint image having the second resolution R2 at the peripheral viewpoint, and adjusts an amount of movement and the pixel value of the viewpoint image G23 until the difference becomes minimum. By thus adjusting the pixel value, the resolution of the viewpoint image G23 becomes the first resolution R1.

Next, by using the disparity map related to each of the peripheral viewpoints and the reference viewpoint and adjacent two viewpoint images, the interpolation processing unit 33 interpolates the viewpoint image at the viewpoint between the viewpoints corresponding to the two viewpoint images. In the disparity map, the amount of movement after adjustment is set as the disparity value.

Figure 11:
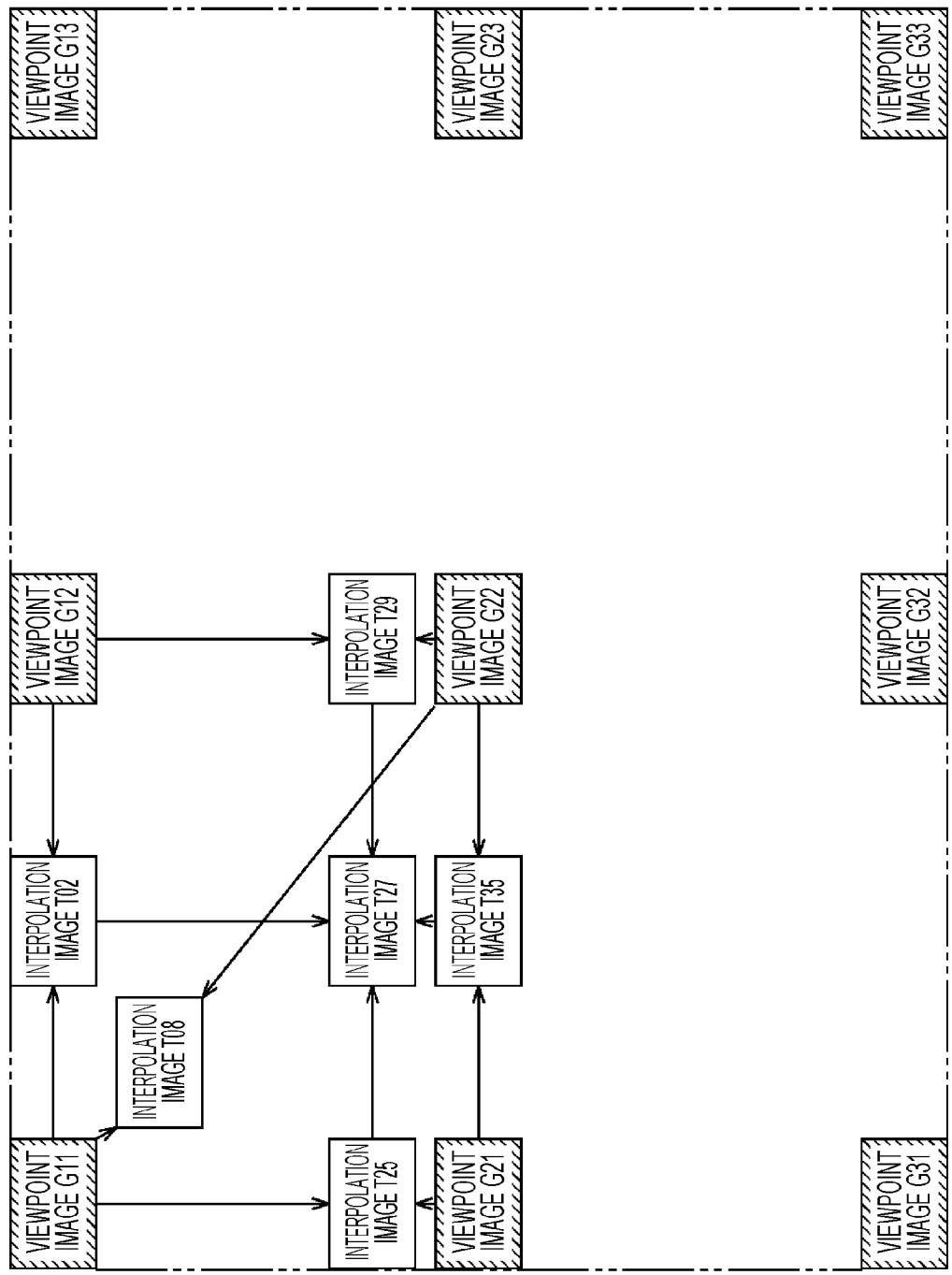
FIG. 11 is a diagram for describing viewpoint interpolation processing in FIG. 6.

For example, as illustrated in FIG. 11, the interpolation processing unit 33 moves, per pixel, the viewpoint image G21 and the viewpoint image G22 having the first resolution R1 by ½ times of the disparity value of the disparity map related to the viewpoint image G21 and the viewpoint image G22. The interpolation processing unit 33 executes averaging or the like for the viewpoint image G21 and the viewpoint image G22 after movement, thereby generating an interpolation image T35 at the viewpoint positioned at a center on a straight line connecting the camera module C21 and camera module C22.

In the same manner, the interpolation processing unit 33 generates, as an interpolation image T02, a viewpoint image at a viewpoint positioned at a center on a straight line connecting the camera module C11 and camera module C12 by using the viewpoint image G11, viewpoint image G12, and disparity map. The interpolation processing unit 33 generates, as an interpolation image T08, a viewpoint image at a viewpoint positioned at a center on a straight line connecting the camera module C11 and camera module C22 by using the viewpoint image G11, viewpoint image G22, and disparity map. An interpolation image T27 is generated after generation of an interpolation image T25 and an interpolation image T29 which are located at the same position as the interpolation image T27 in the horizontal direction or after generation of the interpolation image T02 and an interpolation image T35 which are located at the same position in the vertical direction.

Figure 12:
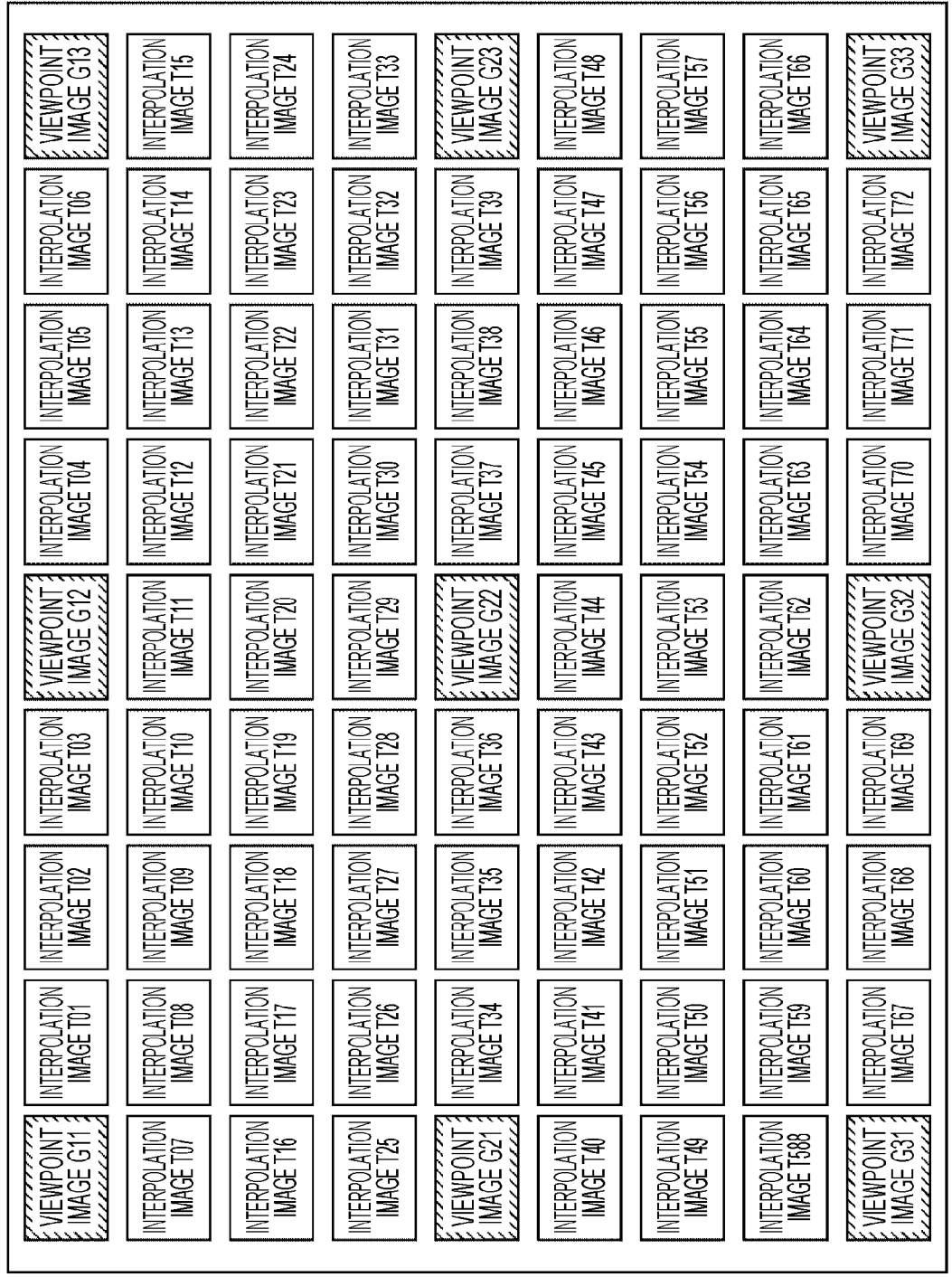
FIG. 12 is a diagram for describing the viewpoint interpolation processing in FIG. 6.

Further, as illustrated in FIG. 12, the interpolation processing unit 33 generates, as an interpolation image T36, a viewpoint image at a viewpoint located at a center of a straight line connecting the viewpoint of the interpolation image T35 and the viewpoint of the camera module C22 by using the viewpoint image G21, viewpoint image G22, and disparity map. The interpolation processing unit 33 generates, as an interpolation image T34, a viewpoint image at a viewpoint positioned at a center of a straight line connecting the viewpoint of the interpolation image T35 and the viewpoint of the camera module C21 by using the viewpoint image G21, viewpoint image G22, and disparity map.

The same processing is performed for adjacent two viewpoint images for all of the viewpoint images G11 to G13, G21 to G23, and G31 to G33 at all of the viewpoints, thereby achieving to generate the interpolation images at the viewpoints inside an area surrounded by the camera module C11 to C13, C21 to C23, and C31 to C33.

In an example in FIG. 12, three viewpoints are provided for the interpolation images between the viewpoints of the two adjacent viewpoint images of the viewpoint images G11 to G13, G21 to G23, and G31 to G33, and therefore, 72 interpolation images T01 to T72 are generated. Of course, the number of the interpolation images is not limited to the example in FIG. 12. The number of the interpolation images is freely set, considering image quality of the final image, processing time and cost for the viewpoint interpolation processing, and so on.

Figure 13:
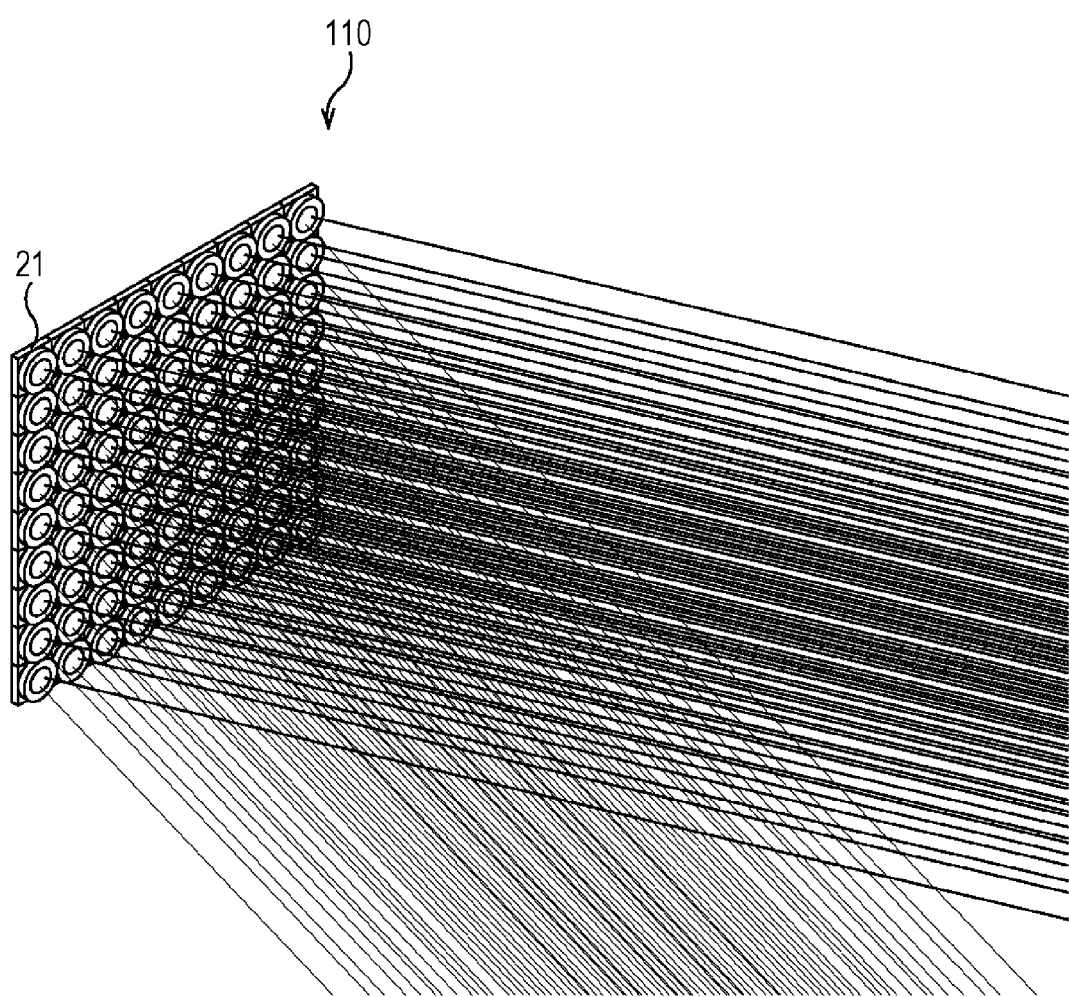
FIG. 13 is a diagram illustrating camera arrays that image the viewpoint image and an interpolation image.

By generating the interpolation images T01 to T72, it is possible to easily obtain, by the imaging unit 11 including only nine camera modules 21, viewpoint images (information of light beam vectors) close to the images when photographed by the camera array 110 including a number of camera modules 21 as illustrated in FIG. 13. Here, in the case where the first resolution R1 is b (vertical)×a (horizontal) pixels, and a viewpoint image having m rows and n columns by the viewpoint interpolation processing, the light beam information of different angles and passing positions can be sampled by the number of b×a×m×n.

The generating method of the interpolation image is not particularly limited.

(Description for Development Processing)

Figure 14:
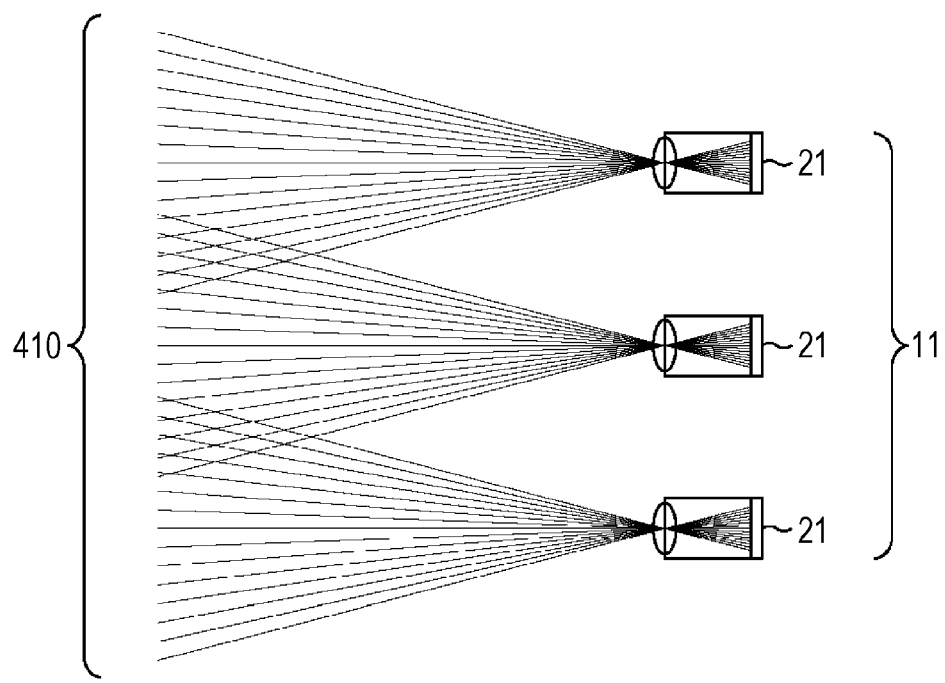
FIG. 14 is a side view of the imaging unit, illustrating light beam vectors of light beams received by the imaging unit.

FIG. 14 is a side view of the imaging unit 11, illustrating light beam vectors of light beams received by the imaging unit 11.

As illustrated in FIG. 14, each of the camera modules 21 of the imaging unit 11 receives the light beams from the same object within a range of the field angle of θ degrees, and images the viewpoint images. Therefore, the viewpoint images imaged by each of the camera module 21 are information of light beam vectors 410 of the light beams from the object at the viewpoint of the camera module 21.

Figure 15:
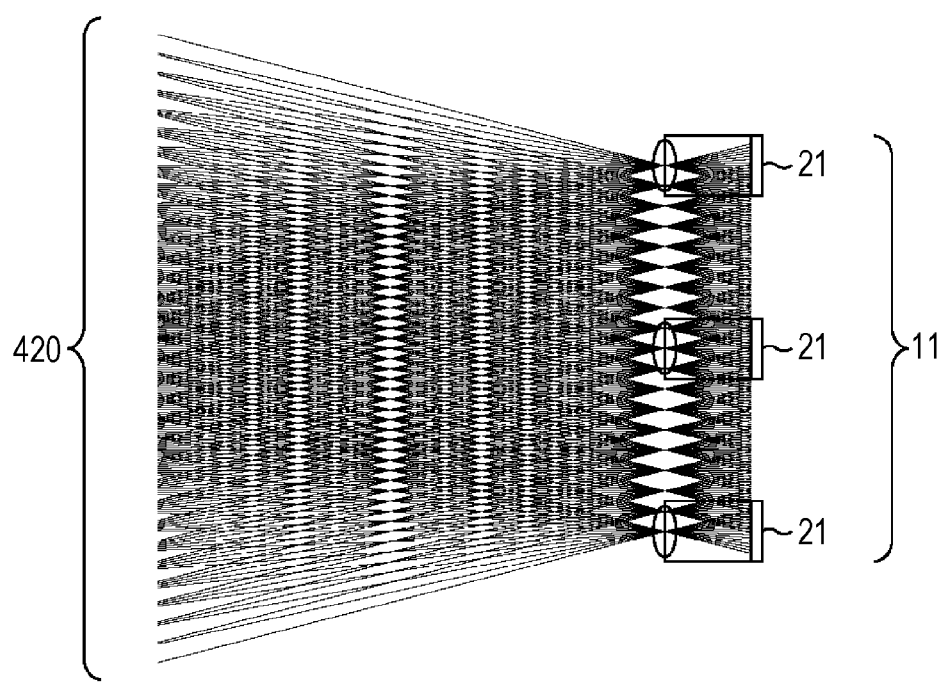
FIG. 15 is a side view of the imaging unit, illustrating the light beam vectors of the viewpoint image and the interpolation image.

FIG. 15 is a side view of the imaging unit 11, illustrating the light beam vectors of the viewpoint images and the interpolation images.

The interpolation image is the viewpoint image at a viewpoint between the adjacent camera modules 21. More specifically, as illustrated in FIG. 15, the interpolation images are information (an estimated value) of the light beam vectors of the light beams from the object at the viewpoints between the adjacent camera modules 21. Therefore, information of light beam vectors 420 of the viewpoint images and the interpolation images is larger than the information of the light beam vector 410.

Figure 16:
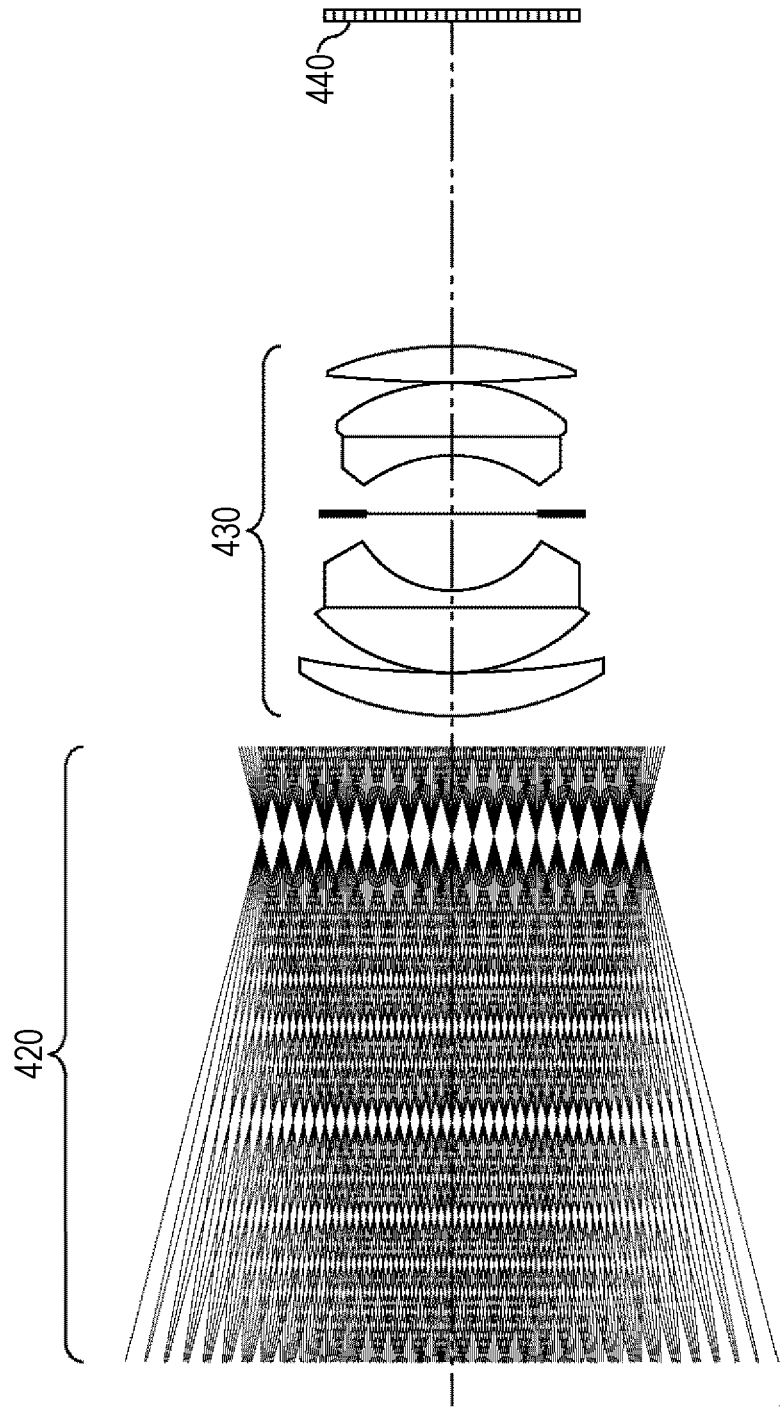
FIG. 16 is a diagram for describing development processing.
Figure 17:
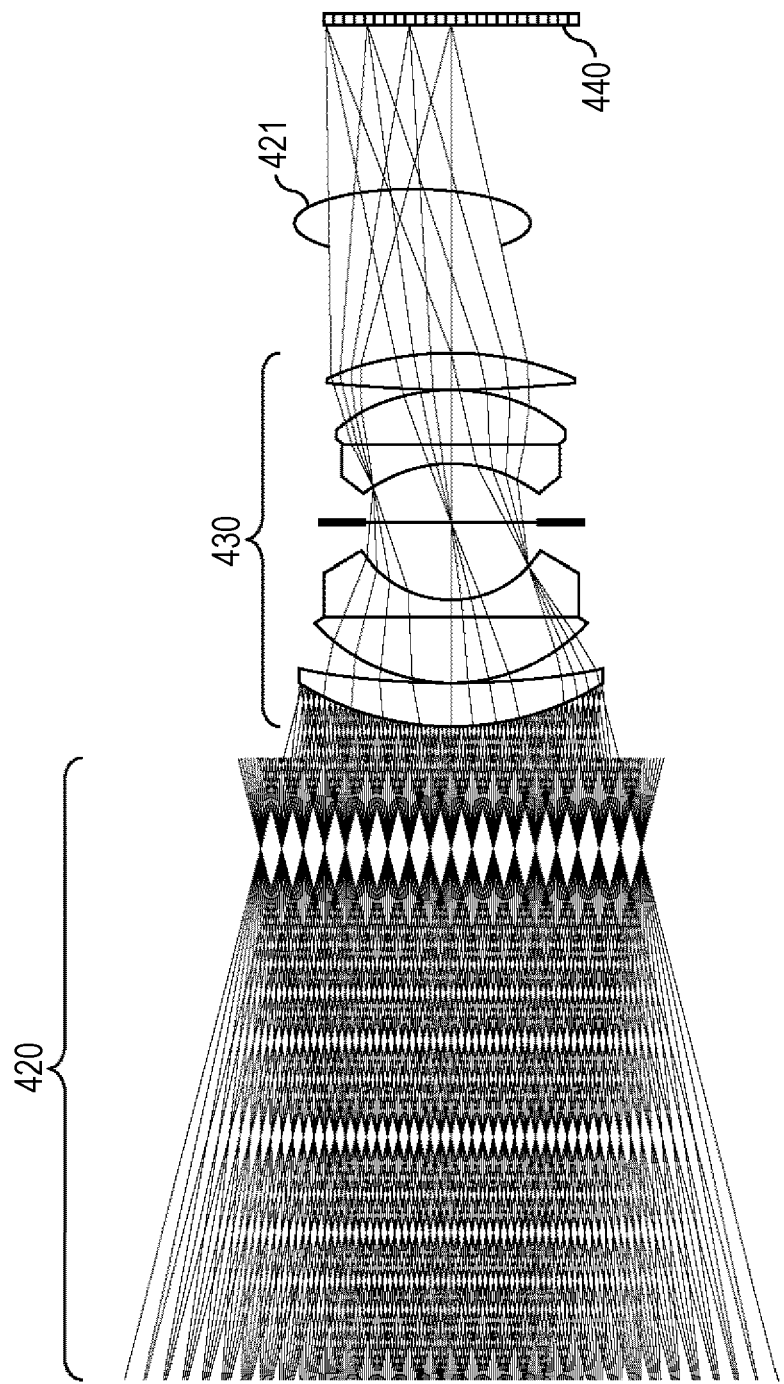
FIG. 17 is a diagram for describing the development processing.

FIGS. 16 and 17 are diagrams for describing the development processing executed based on the light beam vectors 420 and the development parameter.

As illustrated in FIGS. 16 and 17, in the development processing, a captured image when light beams corresponding to the light beam vectors 420 are imaged by a virtual image sensor 440 via a virtual optical system 430 corresponding to the development parameter is reconstructed.

More specifically, the parameters specifying plural kinds of optical systems are stored in the storage unit 13 as a plurality of development parameters. The development parameters may include, for example, lens design information (lens shape, arrangement, quality of material, coating, etc.), a filter, a focus position, an aperture value, an aperture shape, white balance, exposure compensation value, and so on. As the lens design information of the development parameter, not only the design information related to a lens currently available but also the design information related to a non-existent lens with high rarity, a virtual lens that cannot be manufactured in a physical view, etc. can be adopted.

A user selects a desired development parameter from among the plurality of development parameters stored in the storage unit 13. By this, the object image can be imaged by the optical system intended by the user.

Based on the development parameter selected by the use, the development processing unit 34 selects, from light beam vectors 420, light beam vectors 421 of light beams passing the optical system corresponding to the development parameter. For example, in the case where the development parameter selected by the user is the design information related to an interchangeable lens developed for a single-lens reflex camera, the development processing unit 34 selects, from the light beam vectors 420, the light beam vectors of the light beams radiating an aperture surface of the interchangeable lens and entering the inside thereof.

Then, the development processing unit 34 finds, by performing optical simulations, which positions of a virtual image sensor 440 the light beams of the light beam vectors 421 reach. The development processing unit 34 extracts, per pixel, information of the light beam vectors 421 of the light beams that reach the position of the pixel or peripheral positions thereof based on the viewpoint images or the interpolation images, and generates a pixel value indicating a color and luminance.

As described above, since the light beam vectors 420 represented by the viewpoint images and the interpolation images is high-density, the development processing unit 34 can reconstruct the object image imaged via an optional optical system by using the information of the light beam vectors 420. As a result, the user can execute virtual photographing by changing the focus position and the aperture with an optional lens any number of times after photographing.

(Description for Processing in Information Processing Device)

Figure 18:
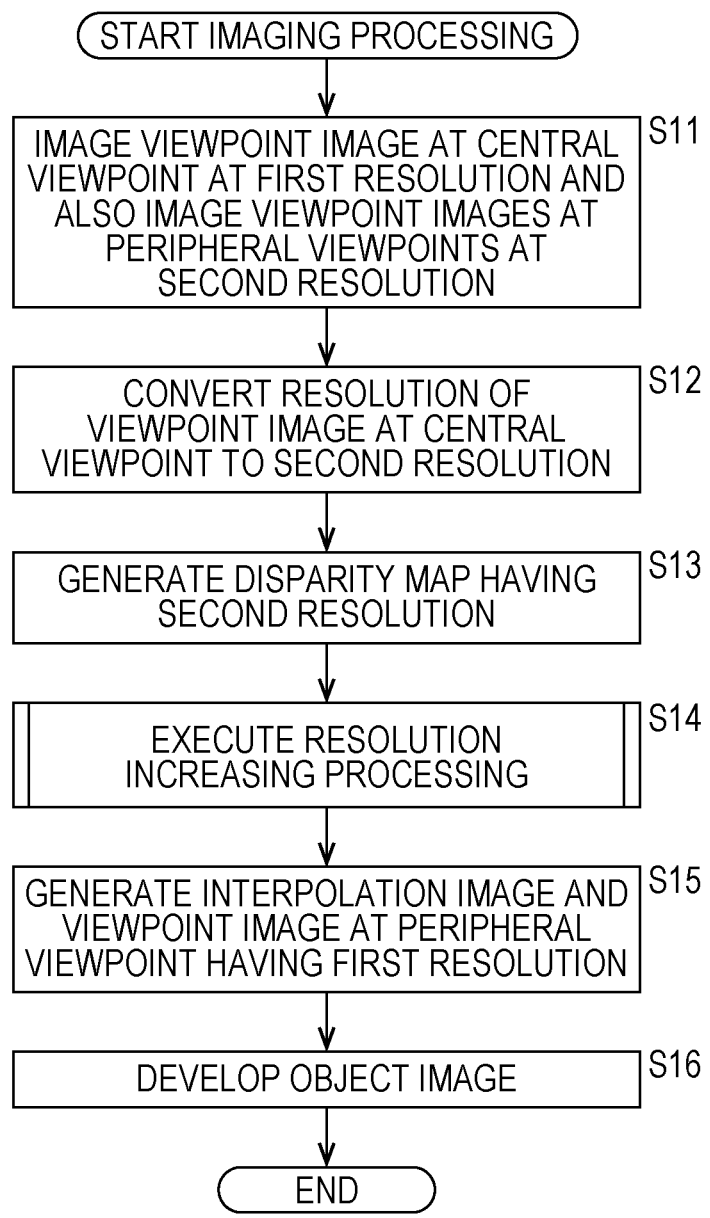
FIG. 18 is a flowchart for describing imaging processing in the information processing device in FIG. 1.

FIG. 18 is a flowchart for describing the imaging processing in the information processing device 10 in FIG. 1.

In step S11 of FIG. 18, the imaging unit 11 of the information processing device 10 images the viewpoint image at the central viewpoint at the first resolution R1, and also images the viewpoint images at the peripheral viewpoints at the second resolution R2.

In step S12, the resolution conversion unit 31 of the image processing unit 30 converts, to the second resolution R2, the resolution of the viewpoint image at the central viewpoint imaged by the imaging unit 11. The resolution conversion unit 31 supplies the correlation value calculation unit 32 with the viewpoint image having the second resolution R2 at the central viewpoint as a result thereof.

In step S13, the correlation value calculation unit 32 executes the stereo matching processing by using the viewpoint image having the second resolution R2 at the central viewpoint and the viewpoint images having the second resolution R2 at the peripheral viewpoints, thereby generating the disparity map having the second resolution R2.

In step S14, the correlation value calculation unit 32 executes the resolution increasing processing in which the resolution of the generated disparity map is converted to the first resolution R1. The details of the resolution increasing processing will be described later with reference to FIG. 19. The correlation value calculation unit 32 interpolates the disparity value outside the edge region based on the disparity value of the edge region of the disparity map having the first resolution R1 obtained as a result of the resolution increasing processing, and supplies the same to the interpolation processing unit 33.

In step S15, the interpolation processing unit 33 generates the interpolation images and the viewpoint images at the peripheral viewpoints both having the first resolution R1 by using the disparity map having the first resolution R1 supplied from the correlation value calculation unit 32 and the viewpoint images imaged at all of the viewpoints. The interpolation processing unit 33 supplies the development processing unit 34 with the viewpoint images at the central viewpoint, peripheral viewpoints, and the interpolation image which have the first resolution R1.

In step S16, the development processing unit 34 develops (reconstruct) the object image by using the viewpoint images and the interpolation image supplied from the interpolation processing unit 33 and the development parameter selected by the user from among the plurality of development parameters stored in the storage unit 13. The development processing unit 34 outputs, as the final image, the image having the first resolution R1 obtained as a result thereof. Then, the processing ends.

Figure 19:
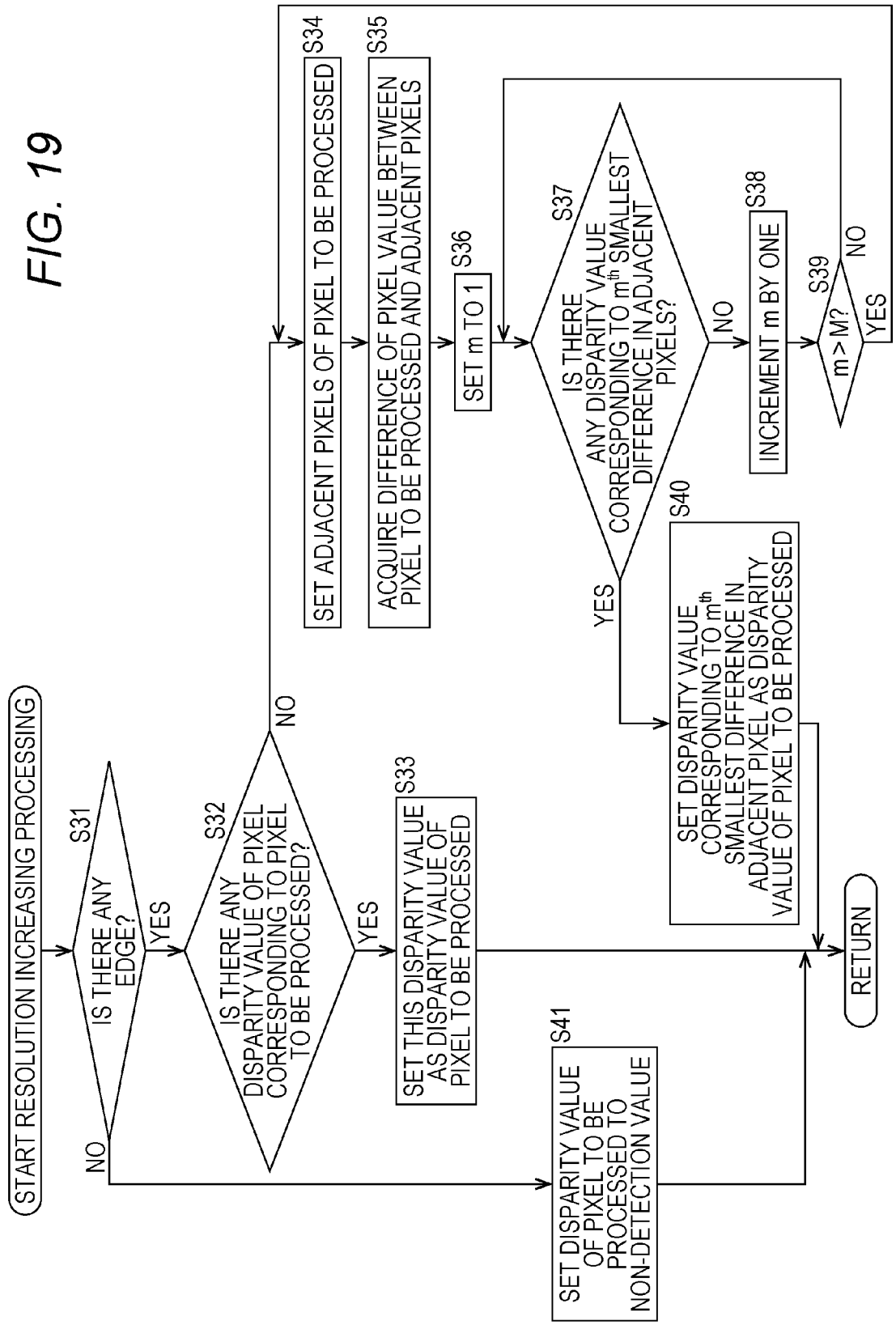
FIG. 19 is a flowchart for describing details of resolution increasing processing in FIG. 18.

FIG. 19 is a flowchart for describing the resolution increasing processing in step S14 of FIG. 18. The resolution increasing processing is executed for respective pixels of an image having the first resolution R1 at the central viewpoint as a target to be processed.

In step S31 of FIG. 19, the correlation value calculation unit 32 determines whether there is any edge in the pixel to be processed. In the case of determining in step S31 that there is an edge in the pixel to be processed, the processing proceeds to step S32.

In step S32, the correlation value calculation unit 32 determines whether there is any disparity value of a pixel corresponding to the pixel to be processed on the disparity map having the second resolution R2.

In the case of determining in step S32 that there is a disparity value, the correlation value calculation unit 32 sets this disparity value as the disparity value of the pixel to be processed on the disparity map having the first resolution R1 in step S33. Then, the processing returns to step S14 in FIG. 18.

On the other hand, in the case of determining in step S32 that there is no disparity value, the correlation value calculation unit 32 sets pixels vertically and horizontally adjacent to the pixel to be processed as the adjacent pixels in step S34. In step S35, the correlation value calculation unit 32 acquires a difference between pixel values of the pixel to be processed and each of the adjacent pixels in the viewpoint image at the central viewpoint having the first resolution R1.

In step S36, the correlation value calculation unit 32 sets m to 1. In step S37, the correlation value calculation unit 32 determines whether there is any disparity value corresponding to a $m^{th}$ smallest difference in the adjacent pixels.

In the case of determining in step S36 that there is such a disparity value, the correlation value calculation unit 32 increments m by one in step S38. In step S39, the correlation value calculation unit 32 determines whether m is larger than M which is the number of the adjacent pixels, more specifically, whether there is not any disparity value in all of the adjacent pixels.

In the case of determining in step S39 that m is not larger than the number M of the adjacent pixels, the processing returns to step S37 and the subsequent processing is repeated.

On the other hand, in the case of determining in step S39 that m is larger than the number M of the adjacent pixels, the processing returns to step S34, and the correlation value calculation unit 32 sets, as the adjacent pixels, the pixels vertically and horizontally adjacent to the pixel located next to the pixel to be processed on the right side. Then, the subsequent processing is repeated.

Further, in the case of determining in step S36 that there is a disparity value, the processing proceeds to step S40. In step S40, the correlation value calculation unit 32 sets, as the disparity value of the pixel to be processed, this disparity value of the adjacent pixel corresponding to the $m^{th}$ smallest difference in the disparity map having the second resolution R2. Then, the processing returns to step S14 in FIG. 18.

On the other hand, in the case of determining in step S31 that there is no edge, the correlation value calculation unit 32 sets the disparity value of the pixel to be processed as the non-detection value in step S41, and the processing returns to step S14 in FIG. 18.

(Second Exemplary Configuration of Image Processing Unit)

Figure 20:
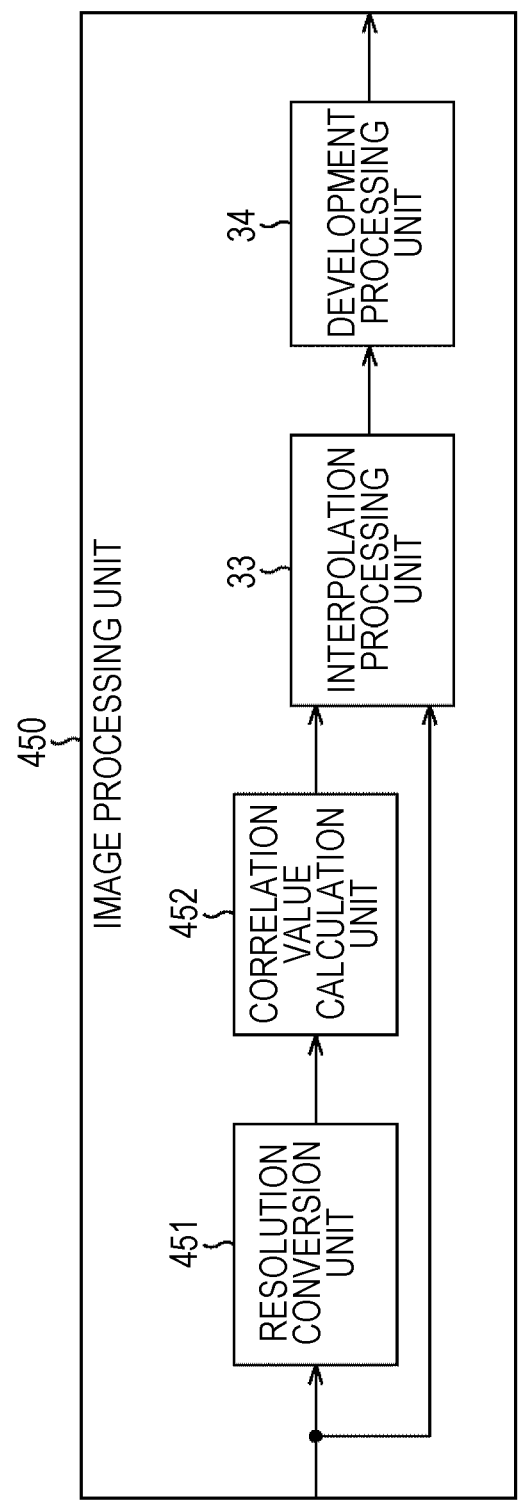
FIG. 20 is a block diagram illustrating a second exemplary configuration of the image processing unit.

FIG. 20 is a block diagram illustrating a second exemplary configuration of the image processing unit implemented by the CPU 15.

Among components illustrated in FIG. 20, the components same as those in FIG. 5 are denoted by the same reference signs. Repetition of the same description will be suitably omitted.

A configuration of an image processing unit 450 in FIG. 20 differs from the configuration of the image processing unit 30 in FIG. 5 in a point that a resolution conversion unit 451 and a correlation value calculation unit 452 are provided instead of the resolution conversion unit 31 and the correlation value calculation unit 32. The image processing unit 450 converts the resolution of the viewpoint image at the peripheral viewpoint to the first resolution, and executes the stereo matching processing at the first resolution.

More specifically, the resolution conversion unit 451 of the image processing unit 450 converts, to the first resolution R1, the resolution of the viewpoint image having the second resolution R2 at the peripheral viewpoint among the plurality of viewpoint images imaged by the imaging unit 11 in FIG. 1. The resolution conversion unit 451 supplies the correlation value calculation unit 452 with the viewpoint image having the first resolution R1 at the peripheral viewpoint obtained as a result thereof and the viewpoint image at the central viewpoint.

The correlation value calculation unit 452 functions as a generation unit and executes, per pixel having the first resolution R1, the stereo matching processing by using the viewpoint image having the first resolution R1 at the peripheral viewpoint and the viewpoint image at the central viewpoint supplied from the resolution conversion unit 451. Then, the correlation value calculation unit 452 detects, per pixel having the first resolution R1, a distance between local areas inside the viewpoint images at the central viewpoint and the peripheral viewpoint when a correlation value obtained from the stereo matching processing shows the highest correlation.

The correlation value calculation unit 452 generates a disparity map having the first resolution R1 by setting the distance detected per pixel having the first resolution R1 as a disparity value, and supplies the disparity map to the interpolation processing unit 33.

As described above, the image processing unit 450 executes the stereo matching processing by converting the resolution of the viewpoint image having the second resolution R2 at the peripheral viewpoint to the first resolution R1 which is same as the resolution of the viewpoint image at the central viewpoint. Therefore, the image processing unit 450 can obtain a high-resolution viewpoint image at the central viewpoint and the disparity map same as the image processing unit 30 even in the case where the resolution of the viewpoint image imaged at the peripheral viewpoint is lower compared to the resolution of the viewpoint image at the central viewpoint.

(Other Processing Flow for Generating Interpolation Image)

Figure 21:
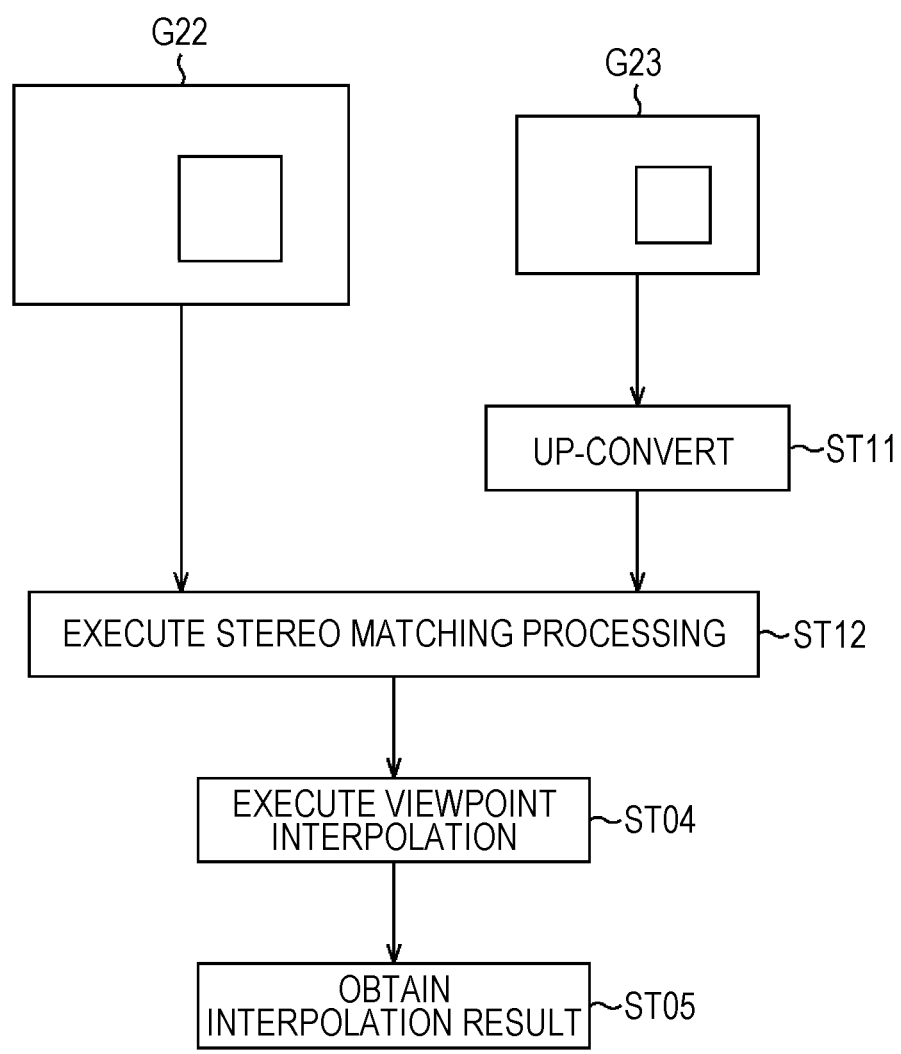
FIG. 21 is a diagram for describing a processing flow to generate an interpolation image in the image processing unit in FIG. 20.

FIG. 21 is a diagram for describing a processing flow to generate the interpolation image in the image processing unit 450 of FIG. 20. The image processing unit 450 calculates the correlation values between the viewpoint image G22 at the central viewpoint and each of the viewpoint images G11 to G13, G21, G23, and G31 to G33 at the peripheral viewpoints. Here, however, an exemplary case of calculating the correlation value between the viewpoint image G22 and the viewpoint image G23 including the disparity only in the horizontal direction will be described.

Figure 22:
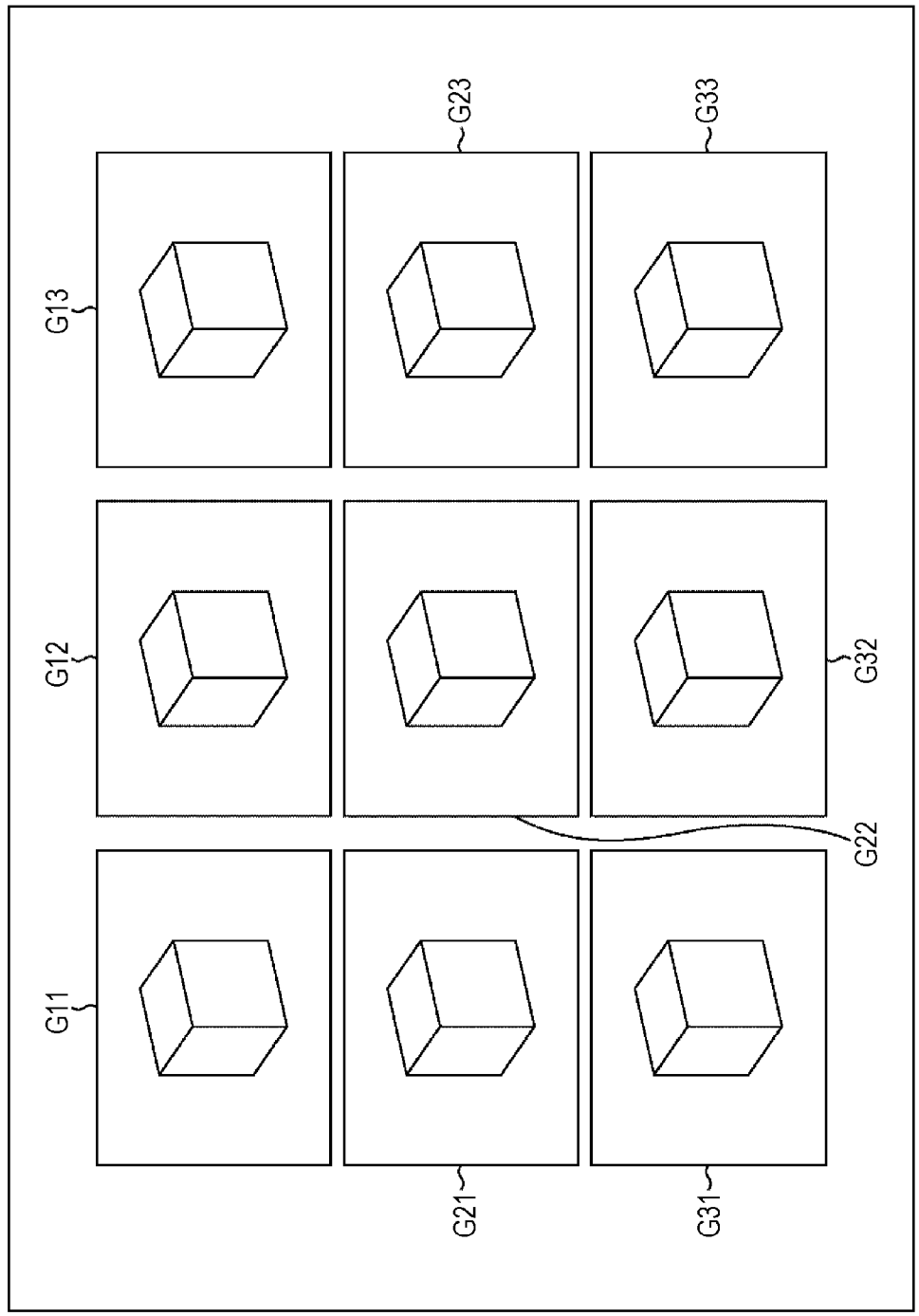
FIG. 22 is a diagram illustrating an exemplary viewpoint image after a resolution is converted by a resolution conversion unit in FIG. 20.

The resolution conversion unit 451 converts (up-converts), to the first resolution R1, the resolution of the viewpoint image G23 having the second resolution R2 imaged by the imaging unit 11 (step ST11). By this, the resolutions of the viewpoint image G22 and the viewpoint image G23 become same as illustrated in FIG. 22, and the proper stereo matching processing can be executed. A concrete method of converting the resolution of the viewpoint image G23 to the first resolution R1 is not particularly limited, and for example, super-resolution processing maybe applied.

After converting the resolution, the correlation value calculation unit 452 executes the stereo matching processing to calculate the correlation value between the viewpoint image G22 and viewpoint image G23 having the first resolution R1, and generates the disparity map having the first resolution R1 (step ST12).

After that, the interpolation processing unit 33 refers to the disparity map having the first resolution R1 obtained from the same processing described above, the imaged viewpoint image G22, and viewpoint image G23, and generates the viewpoint image G23 having the first resolution R1 and also interpolates the viewpoint image having the first resolution R1 at a viewpoint between the viewpoints of the viewpoint image G22 and viewpoint image G23 (step ST04). By this, the viewpoint image G23 having the first resolution R1 can be obtained and also an interpolation image having the first resolution R1, namely, the viewpoint image between the viewpoint image G22 and the viewpoint image G23, can be obtained as a result of interpolation (step ST05).

(Other Example of Imaging Processing)

Figure 23:
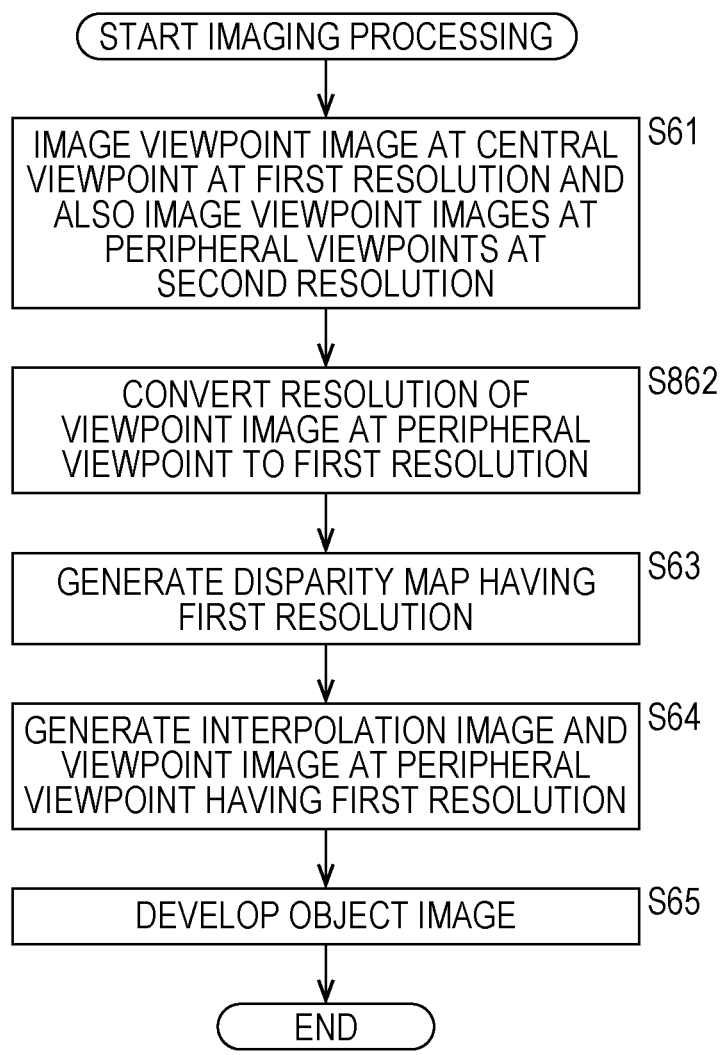
FIG. 23 is a flowchart for describing imaging processing in the case where a CPU functions as the image processing unit in FIG. 20.

FIG. 23 is a flowchart for describing imaging processing in the information processing device 10 in the case where the CPU 15 functions as the image processing unit 450.

In step S61 of FIG. 23, the imaging unit 11 of the information processing device 10 images the viewpoint image at the central viewpoint at the first resolution R1 and images the viewpoint images at the peripheral viewpoint at the second resolution R2.

In step S62, the resolution conversion unit 451 of the image processing unit 450 converts, to the first resolution R1, the resolution of the viewpoint image at the peripheral viewpoint imaged by the imaging unit 11. The resolution conversion unit 451 supplies the correlation value calculation unit 452 with the viewpoint image having the first resolution R1 at the peripheral viewpoint obtained as a result thereof.

In step S63, the correlation value calculation unit 452 generates the disparity map having the first resolution R1 by executing the stereo matching processing using the viewpoint image having the first resolution R1 at the peripheral viewpoint and the viewpoint image having the first resolution R1 at the central viewpoint. The correlation value calculation unit 452 supplies the interpolation processing unit 33 with the disparity map having the first resolution R1.

Processing in steps S64 and S65 are same as the processing in steps S15 and S16 in FIG. 18, and therefore, a description therefor will be omitted.

As described above, the image processing unit 450 obtains, per pixel having the first resolution R1, the phase difference by using the image at the central viewpoint and the images at the peripheral viewpoint having the first resolution R1, and generates the disparity map having the first resolution R1. Therefore, the disparity map having the first resolution R1 can be generated with higher accuracy, compared to the image processing unit 30.

In contrast, the image processing unit 30 obtains, per pixel having the second resolution R2, the phase difference by using the image at the central viewpoint and the image at the peripheral viewpoint having the second resolution R2, and generates the disparity map having the first resolution R1. Therefore, the disparity map having the first resolution R1 can be generated with a less calculation amount, compared to the image processing unit 450.

In the case where the second resolution R2 is ½ in one of axes of the first resolution R1, the resolution conversion unit 451 sets the number of pixels in the vertical direction of the viewpoint image at the central viewpoint to ½ and sets the number of pixels in the horizontal direction of the viewpoint image at the peripheral viewpoint twice, considering the calculation amount and calculation accuracy of the disparity. In this case, processing same as the processing in step ST03 in FIG. 6 is executed after the processing in step ST12 in FIG. 21, and the resolution of the disparity map is converted to the first resolution R1.

Second Embodiment

Exemplary Configuration of System According to One Embodiment

Figure 24:
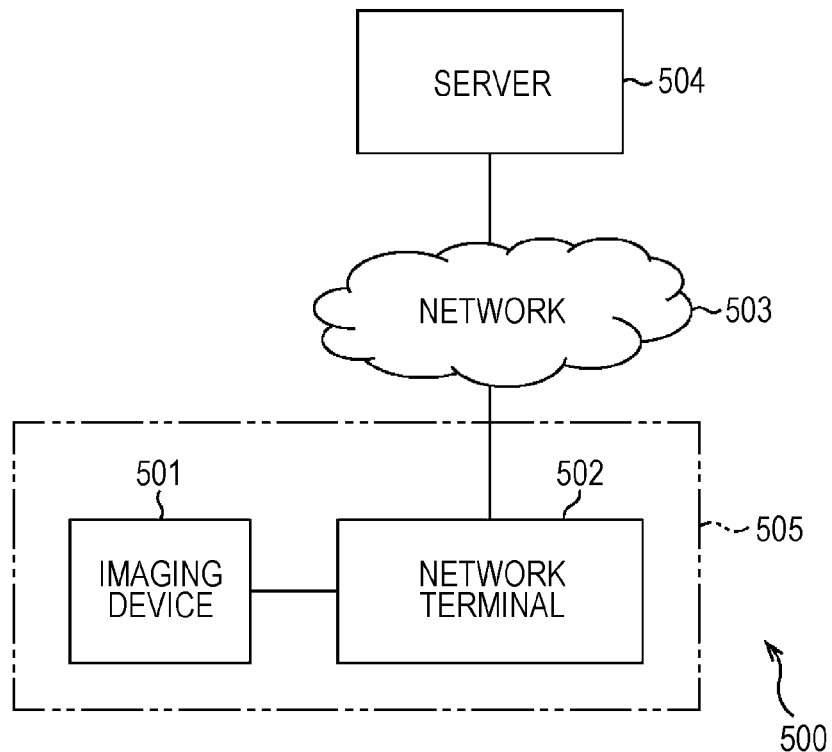
FIG. 24 is a diagram illustrating an exemplary configuration of a system according to an embodiment to which the present technology is applied.

FIG. 24 is a diagram illustrating an exemplary configuration according to an embodiment of a system to which the present technology is applied.

A system 500 in FIG. 24 is formed by connecting a network terminal 502 capable of communicating with an imaging device 501 to a server 504 on a cloud via a network 503. The system 500 executes processing of an information processing device 10 in FIG. 1 by means of a plurality of devices.

More specifically, the imaging device 501 includes a digital still camera to photograph a still image and a digital video camera to photograph a moving image. The imaging device 501 includes an imaging unit 11 above described, and images a viewpoint image having a first resolution R1 at a central viewpoint and a viewpoint image having a second resolution R2 at a peripheral viewpoint. The imaged viewpoint image is transmitted to the network terminal 502.

The network terminal 502 is typically an information processing device such as a personal computer (PC (Personal Computer), a smartphone, a portable phone, a tablet PC, and a PDA (Personal Digital Assistant).

The imaging device 501 and the network terminal 502 can communicate by wire or by wireless, and the network terminal 502 receives the viewpoint image imaged at the imaging device 501. The network terminal 502 can also communicate with the server 504 via the network 503. The network terminal 502 transmits the viewpoint image to the server 504 via the network 503.

The network 503 includes a wireless LAN (IEEE802.11, etc.) such as the Internet, a wired LAN (Local Area Network), and a WiFi (Wireless Fidelity), or a radio mobile communication network of 3G or 4G method and the like.

The server 504 provides a user of the network terminal 502 with a development processing system configured to execute virtual photographing by using the viewpoint image. More specifically, the server 504 functions as an image processing unit 30 (450) described above, and develops an object image based on the development parameters and the viewpoint images at N viewpoints (here, nine viewpoints) transmitted from the network terminal 502. Further, the server 504 stores the development parameters. Further, the server 504 executes charging processing with respect to the development processing at which a development parameter, such as a special lens attractive to a user, is used from among the stored development parameters.

Here, note that the imaging device 501 and the network terminal 502 are configured separately, but may also be integrally configured as a mobile terminal 505. In this case, the mobile terminal 505 executes both imaging of the viewpoint image and transmission of the viewpoint image to the server 504.

(Exemplary Hardware Configuration of Server)

Figure 25:
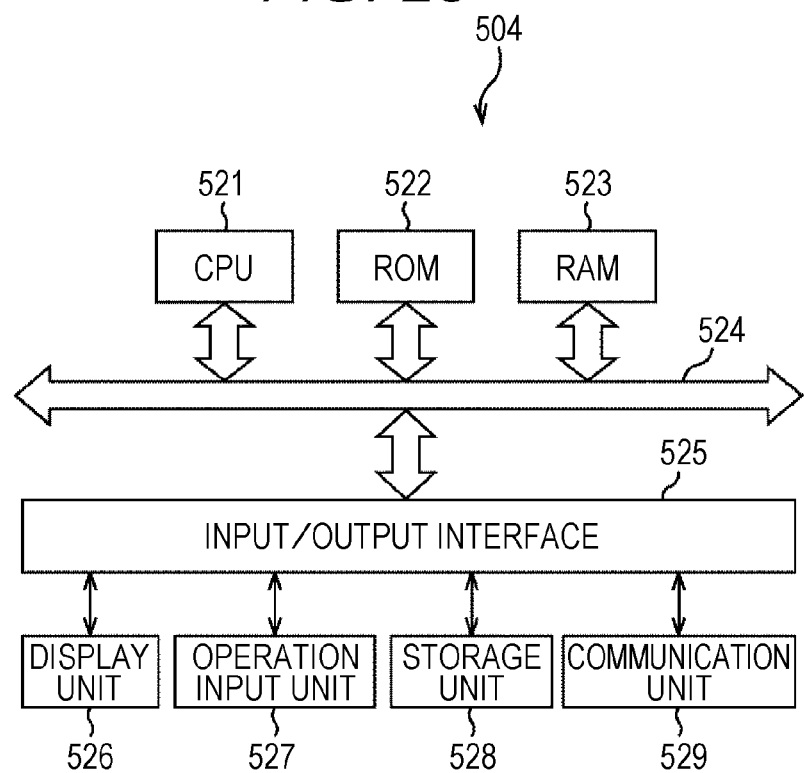
FIG. 25 is a diagram illustrating an exemplary hardware configuration of a server in FIG. 24.

FIG. 25 is a diagram illustrating an exemplary hardware configuration of the server 504 in FIG. 24.

As illustrated in FIG. 25, the server 504 includes a CPU (Central Processing Unit) 521, a ROM (Read Only Memory) 522, a RAM (Random Access Memory) 523, an input/output interface 525, and a bus 524 for mutual connection.

The CPU 521 executes programs stored in the ROM 522 and RAM 523, thereby integrally controlling respective blocks in the server 504. More specifically, the CPU 521 functions as the image processing unit 30 (450). Also, the CPU 521 receives the viewpoint image and the like and further transmits a reconstructed object image and the like by controlling the communication unit 529. The CPU 521 may have a function same as a front end in a Web server, and may execute, for example, basic Web operation such as outputting a main page.

The ROM 522 is a non-volatile memory in which an OS (Operating System) and a program executed by the CPU 521, various kinds of parameters, etc. are fixedly stored. The RAM 523 is used as a work area or the like of the CPU 521, and temporarily keeps the OS, various kinds of applications being executed, various kinds of data being processed.

The input/output interface 525 is connected to a display unit 526, an operation input unit 527, a storage unit 528, a communication unit 529, and so on.

The display unit 526 is a display device using, for example, an LCD, an OELD, a CRT, etc. The operation input unit 527 is, for example, a pointing device such as a mouse, a keyboard, a touch panel, and other input device. In the case where the operation input unit 527 is the touch panel, the touch panel may be integrally formed with the display unit 526.

The storage unit 528 is the non-volatile memory such as an HDD, a flash memory, and other solid-state memory. The storage unit 528 stores the OS, various kinds of applications, and various kinds of data. Particularly, according to the present embodiment, the storage unit 528 stores the viewpoint images at the N viewpoints received from the network terminal 502. Further, the storage unit 528 stores the plurality of development parameters.

The communication unit 529 is an NIC (Network Interface Card) for priority connection to the network 503 or is a module for radio communication, and executes communication processing with the network terminal 502. The communication unit 529 receives the viewpoint images at the N viewpoints from the network terminal 502, and transmits the developed object image to the network terminal 502.

Further, the communication unit 529 transmits, to the network terminal 502, the plurality of development parameters stored in the storage unit 528 as available choices of the development parameters. The communication unit 529 receives an available choice of the development parameter selected by the user from the network terminal 502. The development parameter is used in a development processing unit 34.

(Description for Processing in Server)

Figure 26:
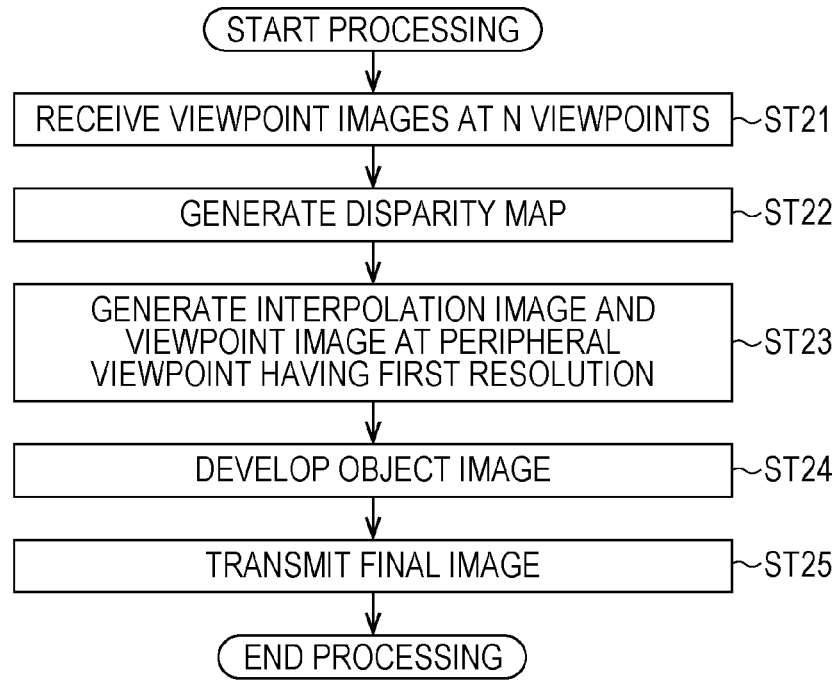
FIG. 26 is a flowchart for describing processing in the server in FIG. 25.

FIG. 26 is a flowchart for describing processing in the server 504 in FIG. 25.

In step ST21 of FIG. 26, the communication unit 529 of the server 504 receives the viewpoint images at the N viewpoints from the network terminal 502. In step ST22, the image processing unit 30 (450) of the server 504 generates a disparity map having the first resolution R1 from the viewpoint images at the N viewpoints received from the communication unit 529.

In step ST23, the image processing unit 30 (450) generates an interpolation image and viewpoint images at peripheral viewpoints having the first resolution by using the disparity map having the first resolution R1 and the received viewpoint images at the N viewpoints.

In step ST24, the image processing unit 30 (450) develops an object image based on the interpolation image, the viewpoint image at the central viewpoint, the viewpoint images at the peripheral viewpoints having the first resolution, and the development parameter. The development parameter is selected by the user of the network terminal 502.

In step ST25, the communication unit 529 transmits the developed object image to the network terminal 502 as a final image.

(Exemplary Hardware Configuration of Network Terminal)

Figure 27:
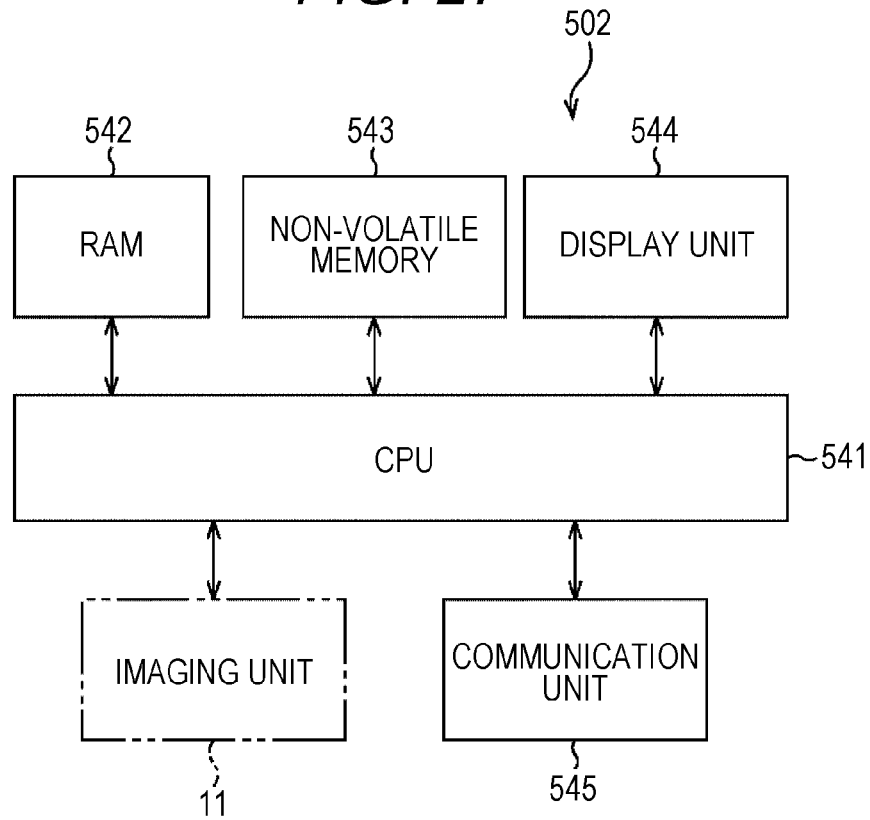
FIG. 27 is a block diagram illustrating an exemplary hardware configuration of a network terminal in FIG. 24.

FIG. 27 is a block diagram illustrating an exemplary hardware configuration of the network terminal 502 in FIG. 24.

As illustrated in FIG. 27, the network terminal 502 includes a CPU 541, a RAM 542, a non-volatile memory 543, a display unit 544, and a communication unit 545.

The CPU 541 executes programs stored in the RAM 523 and the non-volatile memory 543, thereby integrally controlling the respective blocks of the network terminal 502 while accessing the RAM 542 and the like depending on necessity. The RAM 542 is used as a work area or the like of the CPU 541, and temporarily keeps the OS, various kinds of applications being executed, various kinds of data being processed.

The non-volatile memory 543 is, for example, a flash memory or a ROM, and stores the OS, programs (applications) and the various kinds of parameters to be executed by the CPU 541. Also, the non-volatile memory 543 stores the viewpoint images which are still images at the N viewpoints, a moving image, etc. imaged by the imaging device 501.

The display unit 544 is, for example, an LCD and an OELD, and displays various kinds of menus, GUI (Graphical User Interface) for the applications, etc. Typically, the display unit 544 is integrally formed with a touch panel, and capable of receiving user's touch operation. For instance, the display unit 544 displays a setting GUI for selecting the available choices of the development parameters supplied via the communication unit 545. The display unit 544 selects a predetermined development parameter from among the available choices in accordance with the user's touch operation at the setting GUI being displayed, and supplies the selected development parameter to the communication unit 545.

The communication unit 545 executes communication with the server 504 via the network 503, communication with the imaging device 501, communication with other peripheral mobile terminals, and so on. For example, the communication unit 545 receives the viewpoint images at the N viewpoints transmitted from the imaging device 501 and stores the received viewpoint images in the non-volatile memory 543. The communication unit 545 transmits, to the server 504, the viewpoint images at the N viewpoints stored in the non-volatile memory 543.

Also, the communication unit 545 receives the available choices of the development parameters transmitted from the server 504. The communication unit 545 notifies the server 504 of the selected development parameter from among the available choices of the development parameters.

Meanwhile, although not illustrated, a hardware configuration of the mobile terminal 505 where the imaging device 501 and network terminal 502 are integrally formed is same as the configuration of the network terminal 502 except for one point that the imaging unit 11 is newly provided as illustrated in FIG. 27.

(Example of Screen)

Figure 28:
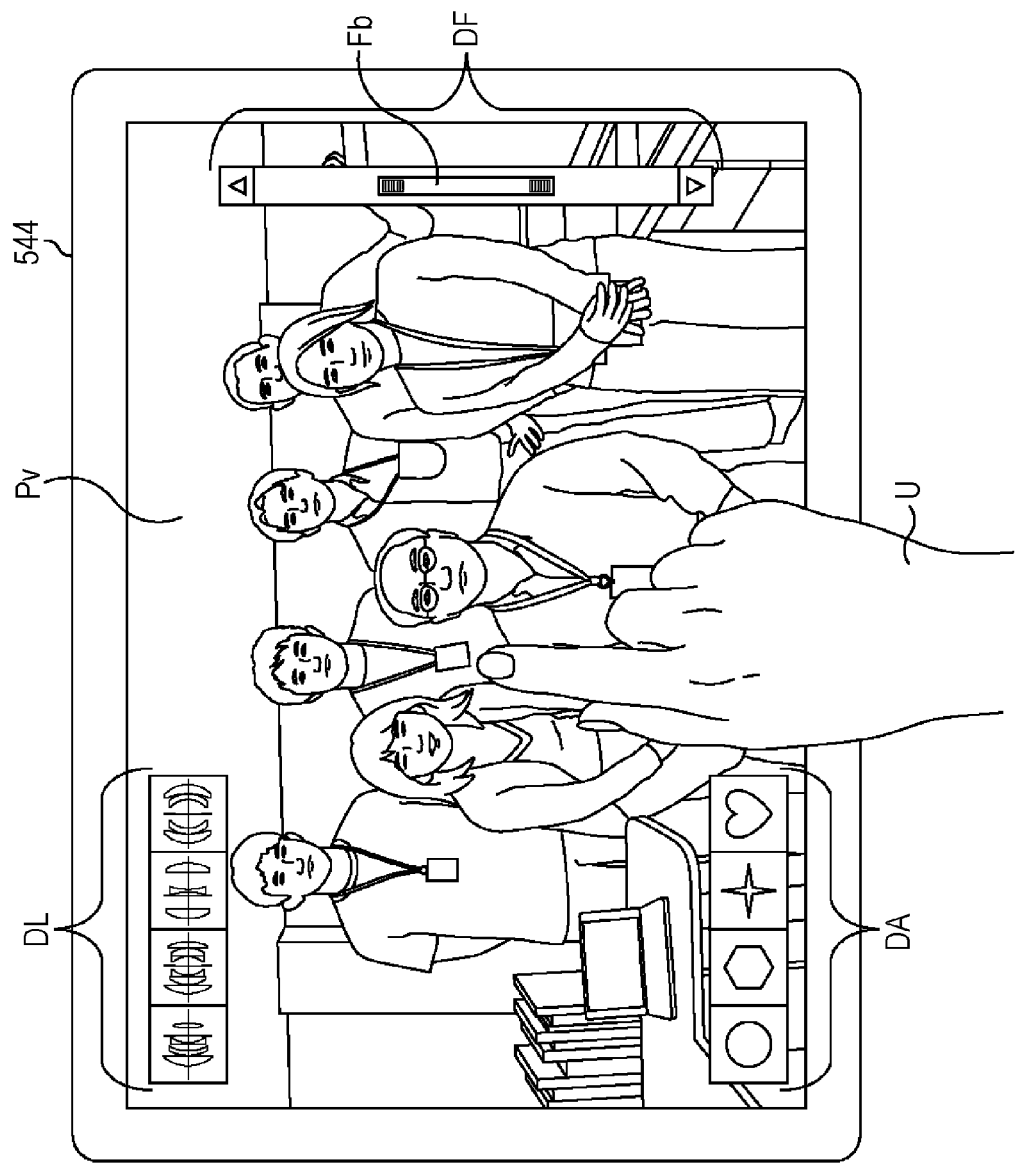
FIG. 28 is a schematic diagram illustrating an example of a setting GUI.

FIG. 28 is a schematic diagram illustrating an example of a setting GUI displayed on the display unit 544.

In a screen of FIG. 28, the setting GUI is displayed together with a preview image Pv. In the example of FIG. 28, the development parameters include lens design information, an aperture value shape, and a focus position.

In this case, a lens unit selection section DL, an aperture shape selection section DA, and a focus position selection section DF are displayed as the setting GUI on the display unit 544 in a superimposing manner on the preview image Pv.

In the lens unit selection section DL, graphics indicating the lens units are displayed based on the available choices of the lens design information in the development parameters. In the aperture shape selection section DA, graphics indicating the available choices of the aperture shape of the development parameters are displayed. In the focus position selection section DF, a setting bar Fb indicating the available choices of focus position by positions is displayed.

The user selects an available choice of the lens design information corresponding to the lens unit by touching a graphic indicating a desired lens unit displayed at the lens unit selection section DL with a finger U. Further, the user selects an available choice of the aperture shape by touching a graphic indicating a desired aperture shape displayed on the aperture shape selection section DA with the finger U.

Additionally, the user moves the setting bar Fb to a position corresponding to a desired focus position by touching the setting bar Fb of the focus position selection section DF with the finger U and vertically moving the finger U. Thus, the user can select an available choice of the desired focus position.

Meanwhile, the setting bar Fb may be configured such that the user moves the position by touching a desired position on the focus position selection section DF instead of the user touching the setting bar Fb with the finger U and then moving the finger U. Further, an available choice of the focus position closest to an object touched by the finger U inside the image may be selected as the focus position without displaying any available choices of the focus positions.

Additionally, in the example of FIG. 28, the lens unit selection section DL is located at upper left of the preview image Pv, the aperture shape selection section DA is located at lower left thereof, and the focus position selection section DF is located on the right side; however, the located positions are not limited thereto.

Although not illustrated, the available choices of other development parameters such as white balance and exposure compensation value can be also displayed in the same manner as the lens unit selection section DL, aperture shape selection section DA, and focus position selection section section DF.

Further, according to the second embodiment, the display unit 544 is integrally formed with the touch panel, but in the case of not being integrally formed with the touch panel, the user may move a pointer displayed on the screen by operating a mouse or the like not illustrated to execute selecting operation equivalent to touching operation.

(Description for Processing in System)

Figure 29:
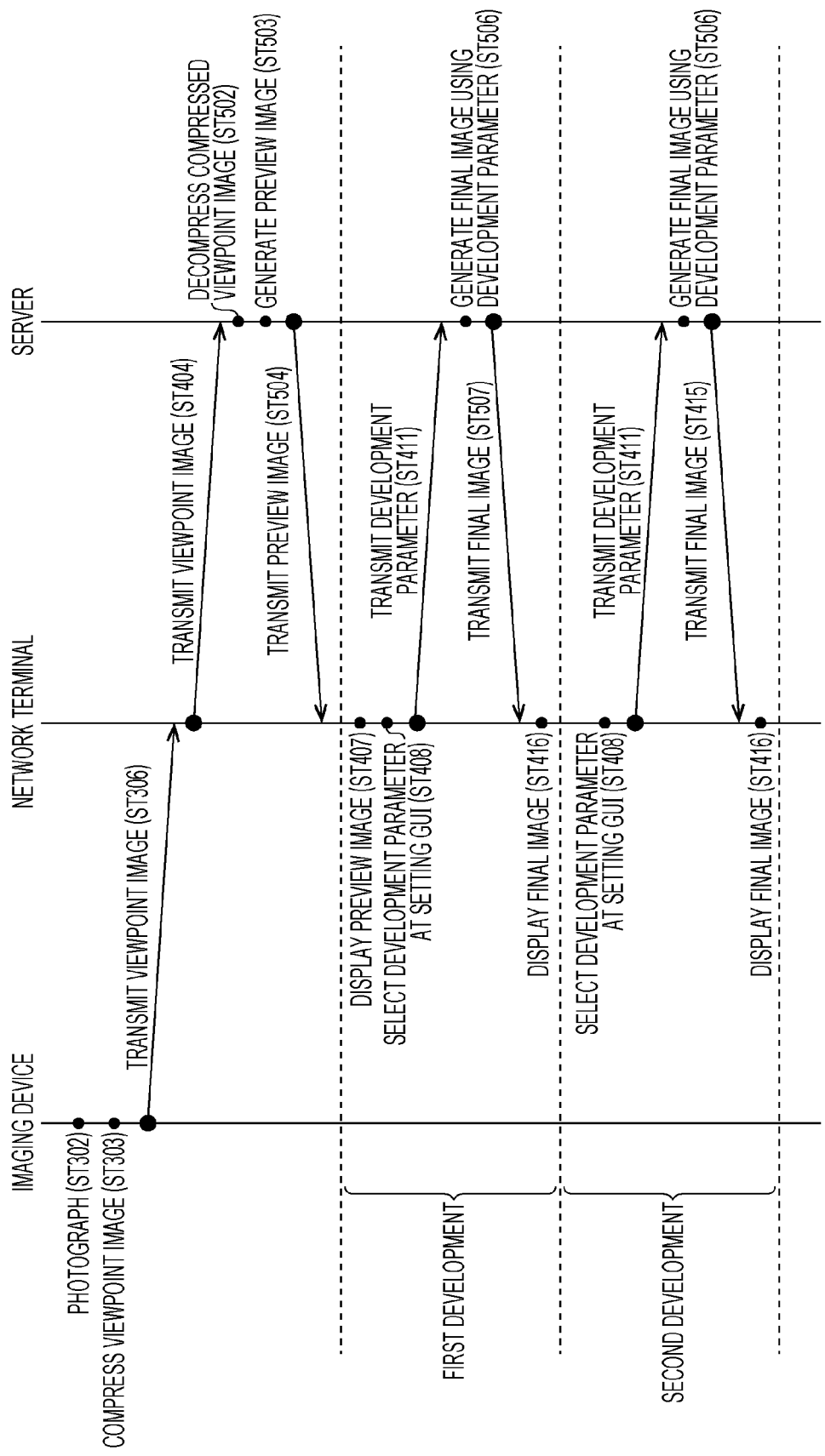
FIG. 29 is a sequence diagram illustrating a flow of basic operation in the system.
Figure 30:
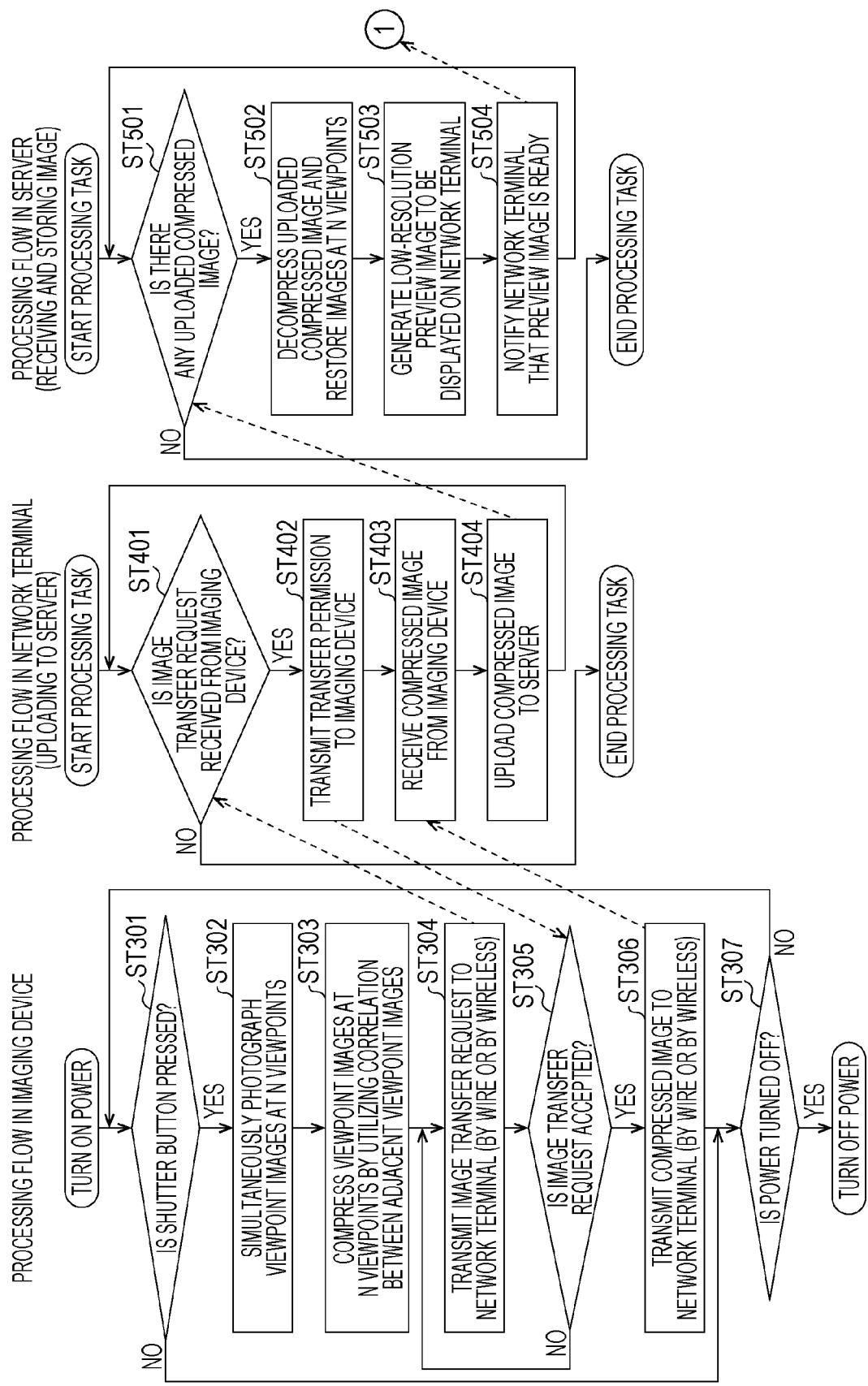
FIG. 30 is a flowchart for describing uploading the viewpoint image to the server.
Figure 31:
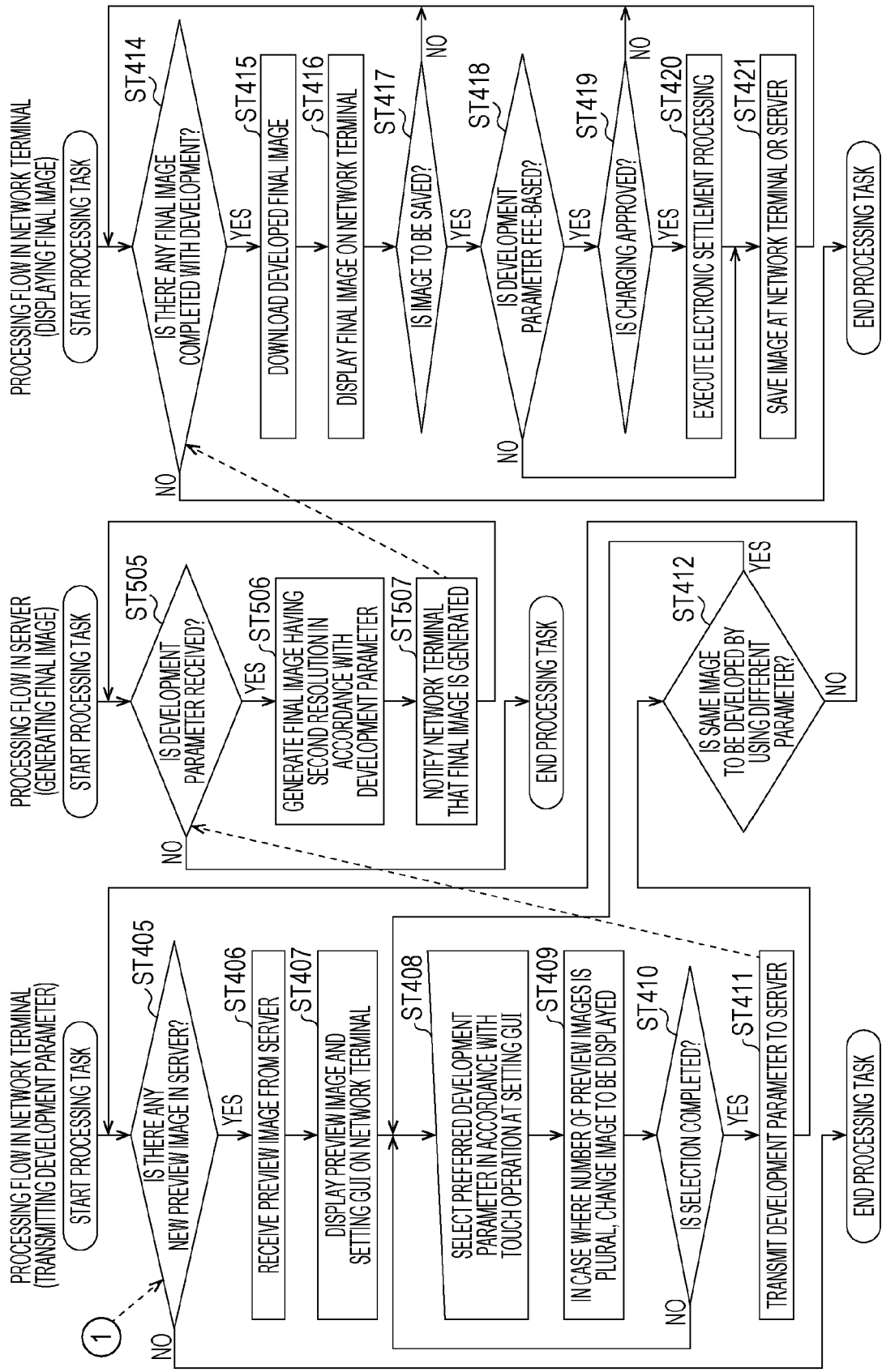
FIG. 31 is a flowchart for describing developing an object image.

FIG. 29 is a sequence diagram illustrating a flow of basic operation in the system 500 in FIG. 24. FIG. 30 is a flowchart for describing uploading a viewpoint image to the server 504, and FIG. 31 is a flowchart for describing developing an object. According to the second embodiment, operation in the network terminal 502 and server 504 is performed by the CPU in cooperation with respective software modules executed under the control thereof.

In ST301, the imaging device 501 determines whether a shutter button not illustrated is pressed when the imaging device 501 is powered off. In the case of determining in step ST301 that the shutter button is pressed, the imaging device 501 simultaneously photographs the viewpoint images at the N viewpoints with the imaging unit 11 in step ST302. In other words, the imaging device 501 captures the viewpoint image having the first resolution R1 at the central viewpoint and the viewpoint images having the second resolution R2 at the peripheral viewpoints.

Next, in step ST303, the imaging device 501 compresses the captured viewpoint images at the N viewpoints by utilizing correlation between the adjacent viewpoint images.

In step ST304, the imaging device 501 transmits an image transfer request to the network terminal 502 by wire or by wireless.

In step ST305, the imaging device 501 determines whether the image transfer request is accepted by the network terminal 502. In the case of determining in step ST305 that the image transfer request is not accepted, the processing returns to step ST304 and the processing of step ST304 and ST305 is repeated until received.

On the other hand, in the case of determining in step ST305 that the image transfer request is accepted, the imaging device 501 transmits, to the network terminal 502, a compressed image of the viewpoint images at the N viewpoints by wire or by wireless in step ST306. Then, the processing proceeds to step ST307.

Further, in the case of determining in step ST301 that the shutter button is not pressed, the processing proceeds to step ST307.

In step ST307, the imaging device 501 determines whether power is turned off, in other words, whether power-off operation is executed by the user.

In the case of determining in step ST307 that power is not turned off, the processing returns to step ST301 and the processing from steps ST301 to ST307 is repeated until power is turned off. Further, in the case of determining in step ST307 that power is turned off, the imaging device 501 is powered off and the processing ends.

In compression processing for the viewpoint images, an algorithm to compress a moving image can be utilized, for example. The viewpoint images at the N viewpoints captured by the imaging device 501 may also be transmitted to the network terminal 502 without compression. By compressing the viewpoint images, a data amount to be transmitted to the network terminal 502 can be reduced. Further, generation of the compressed image may also be executed at the network terminal 502. This can reduce a processing load on the imaging device 501.

The network terminal 502 determines in step ST401 whether the image transfer request from the imaging device 501 is received via the communication unit 545. In the case of determining in step ST401 that the image transfer request is not received, the processing ends.

On the other hand, in the case of determining in step ST401 that the image transfer request is received, the network terminal 502 transmits a transfer permission to the imaging device 501 via the communication unit 545 in step ST402. The imaging device 501 determines that the image transfer request is accepted when receiving the transfer permission.

In step ST403, the network terminal 502 receives the compression image of the viewpoint images at the N viewpoints from the imaging device 501 via the communication unit 545. The network terminal 502 stores the received compressed image in the non-volatile memory 543.

In step ST404, the network terminal 502 uploads (transmits) the compressed image to the storage unit 528 of the server 504 via the communication unit 545 and the network 503. Further, the processing returns to step ST401, and the subsequent processing is repeated.

On the other hand, the server 504 determines in step ST501 whether there is any compressed image uploaded to the storage unit 528 via the communication unit 529. In the case of determining in step ST501 that there is no uploaded compressed image, the processing ends.

Further, in the case of determining in step ST501 that there is an uploaded compressed image, the server 504 decompresses the uploaded compressed image after confirming, and restores the viewpoint images at the N viewpoints to an original state to store them in the storage unit 528 in step ST502.

Next, in step ST503, the server 504 generates a low-resolution preview image to be displayed on the display unit 544 of the network terminal 502. The preview image is generated based on the viewpoint images at the N viewpoints transmitted from the network terminal 502. In step ST504, the server 504 notifies the network terminal 502 that the preview image is ready via the communication unit 545 and the network 503, and transmits the preview image. Then, the processing returns to step ST501, and the subsequent processing is repeated.

The network terminal 502 determines in step ST405 whether there is any new preview image in the server 504 after uploading the compressed image to the storage unit 528 of the server 504 in ST404. More specifically, the network terminal 502 determines whether notified from the server 504 that the preview image is ready.

In the case where the network terminal 502 is notified from the server 504 that the preview image is ready, it is determined in step ST405 that there is no new preview image.

On the other hand, in the case of being notified the from the server 504 that the preview image being ready is received, it is determined in step ST405 that there is a new preview image, and the processing proceeds to step ST406.

In step ST406, the network terminal 502 receives the preview image from the server 504. The received preview image is displayed on the display unit 544 of the network terminal 502, and the image to be developed is confirmed by the user.

The preview image may be generated by the network terminal 502 instead of the server 504. Further, the preview image may a low-resolution viewpoint image at one viewpoint out of the N viewpoints, or may be a sample image obtained by lowering the resolution of the final image developed using the predetermined development parameter. Also, the number of the preview images may be one or may be plural. In the case where the number of preview images is plural and the preview image is a sample image, the development parameters corresponding to respective preview images are different.

The server 504 transmits the available choices of the development parameters to the network terminal 502 at the time of transmitting or after transmitting the preview image. In step ST407, the network terminal 502 receives the available choices of the development parameters, and displays the setting GUI (such as the lens unit selection section DL in FIG. 28) together with the preview image on the display unit 544. Thus, highly convenient development service can be provided to the user.

In step ST408, the network terminal 502 selects the available choice of the development parameter preferred by the user in accordance with the user's touch operation to the setting GUI.

In the case where the number of the preview images is plural in step ST409, the network terminal 502 changes the preview image to be displayed to a preview image close to the selected development parameter. In step ST410, the network terminal 502 determines whether selection of the available choice of the development parameter is completed.

For example, in the case where the user does not complete selecting the development parameter, it is determined in step ST410 that selection of the available choice of the development parameter is not completed, and the processing returns to step ST408. Then, the processing from steps ST408 to ST410 is repeated until selection of the available choice of the development parameter is completed.

In the case of determining in step ST410 that selection of the available choice of the development parameter is completed, for example, in the case where the user completes selection of the development parameter, the processing proceeds to ST411. In step ST411, the network terminal 502 transmits the selected available choice of the development parameter to the server 504.

In step ST412, the network terminal 502 determines whether the current image to be developed is developed by using an available choice of the development parameter different from the selected available choice of the development parameter.

For instance, in the case where the user changes the development parameter, it is determined in step ST412 that development is executed by using the available choice of the development parameter different from the selected available choice of the development parameter. Then, the processing returns to step ST408. As a result, the newly selected available choice of the development parameter is transmitted to the server 504.

On the other hand, in the case where the user does not change the development parameter, it is determined in step ST412 that the development is not executed by using the available choice of the development parameter different from the selected available choice of the development parameter. Then, the processing returns to step ST405.

The server 504 determines in step ST505 whether the development parameter is received from the network terminal 502. In the case of determining in step ST505 that the development parameter is not received, the processing ends.

On the other hand, in the case of determining in step ST505 that the development parameter is received, the server 504 generates a final image having the second resolution R2 in step ST506 in accordance with the development parameter. More specifically, the server 504 executes the processing from steps ST22 to ST24. In other words, the server 504 executes the interpolation processing and converts the uploaded viewpoint images at the N viewpoints to information of high-density light beam vectors, and further executes optical simulation using the development parameter to generate the final image.

In step ST507, the server 504 notifies the network terminal 502 that the final image (object image) is generated, and then transmits the final image to the network terminal 502.

The network terminal 502 determines in step ST414 whether there is any final image completed with development, in other words, whether it is notified from the server 504 that the final image is generated. In the case of determining in step ST414 that there is no final image completed with development, the processing ends.

In the case of determining in step ST414 that there is the final image completed with development, the network terminal 502 downloads the developed final image from the server 504 in step ST415.

In step ST416, the network terminal 502 displays the downloaded final image on the display unit 544. Thus, the user can view the final image. At this point, for example, saving GUI for selecting whether to save the final image is displayed on the display unit 544.

In step ST417, the network terminal 502 determines whether to save the final image in accordance with the user's touching operation to the saving GUI. In the case of determining not to save the final image in step ST417, the processing returns to step ST414, and subsequent processing is executed.

In the case of determining to save the final image in ST417, the network terminal 502 determines in step ST418 whether the available choice of the development parameter selected by the user is fee-based development parameter.

In the case of determining in step ST418 that the development parameter is fee-based, the network terminal 502 displays a message asking for an approval for charge on the display unit 544. Then, in step ST419, the network terminal 502 determines whether the user approves the charge in accordance with the user's touching operation.

In the case of determining in step ST419 that charging is not approved, the final image is not saved and the processing returns to step ST414, and the subsequent processing is repeated.

On the other hand, in the case of determining in step ST419 that charging is approved, the network terminal 502 executes electronic settlement processing in step ST420, and the processing proceeds to step ST421.

Further, in the case of determining in step ST418 that the development parameter is not fee-based, the processing proceeds to step ST421 without executing the electronic settlement processing.

In step ST421, the network terminal 502 saves the downloaded final image in the non-volatile memory 543 of the network terminal 502 or the storage unit 528 of the server 504.

In the case where the server 504 receives again a different kind of development parameter, the above-described processing is executed gain to generate the final image (second development). In this case, the network terminal 502 executes the above-described processing again and saves the final image and executes the electronic settlement processing, if necessary.

As described above, according to the second embodiment, the server 504 functions as the image processing unit 30 (450). Therefore, the server 504 can obtain the high-resolution viewpoint image at the central viewpoint and the disparity map even in the case where the resolution of the viewpoint image at the peripheral viewpoint to be imaged is lower, compared to the resolution of the viewpoint image at the central viewpoint.

Therefore, the system 500 can obtain the high-resolution viewpoint image and the disparity map by using the imaging device 501 having a simple configuration in which the resolution of the camera modules 21 at the peripheral viewpoints is lower, compared to the resolution of the camera module 21 at the central viewpoint. As a result, the manufacturing cost can be reduced.

Further, since the server 504 executes the interpolation processing, the viewpoint images at a large number of viewpoints can be generated with a small number of the camera modules 21, and the object image developed based on the development parameters intended by the user can be reconstructed.

According to the second embodiment, the object image imaged by the imaging device 501 is developed (reconstructed) utilizing the server 504 on the cloud. Due to this, it is not necessary to execute a large amount of arithmetic processing such as interpolation processing and the development processing in the imaging device 501, and low cost and low power consumption can be achieved for the imaging device 501. Further, since the imaging device 501 is separated from the network terminal 502 functioning as a viewer, the imaging device 501 can be easily carried. Due to this, flexible photographing can be performed using the imaging device 501.

<Description for Disparity Map in Present Specification>

Figure 32:
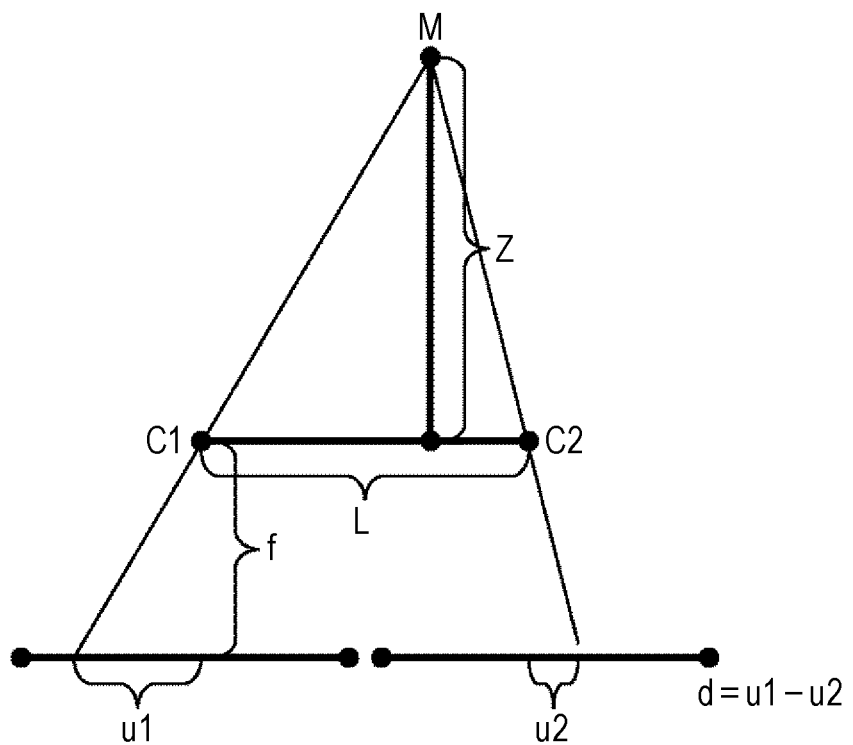
FIG. 32 is a diagram for describing a disparity and a depth.

FIG. 32 is a diagram for describing a disparity (disparity) and a depth.

As illustrated in FIG. 32, in the case where a color image of an object M is photographed by a camera c1 located at position C1 and a camera c2 placed at position C2, a depth Z of the object M, which is a distance in a depth direction from the camera c1 (camera c2), is defined by an Expression (a) as below.

$$Z = (L/d) \times f \quad \text{(a)}$$

Note that L is a distance between the position C1 and the position C2 in a horizontal direction (hereinafter referred to as distance between cameras). Additionally, d is a value obtained by subtracting a distance u2 from a distance u1, namely, the disparity. The distance u1 is a distance in the horizontal direction from a center of the color image to a position of the object M on the color image photographed by the camera c1, and the distance u2 is a distance in the horizontal direction from a center of the color image to a position of the object M on the color image photographed by the camera c2. Further, note that f is a focal length of the camera c1, and the focal lengths of the camera c1 and camera c2 are same in the Expression (a).

As shown in the Expression (a), the disparity d and the depth Z are uniquely converted. Therefore, the disparity map according to a first and the second embodiments can be replaced by an image representing the depth Z. In the following, the disparity map and the image representing the depth Z are integrally referred to as depth image.

The depth image is to an image representing the disparity d or the depth Z, and for a pixel value of the depth image, a value obtained by normalizing the disparity d, a value obtained by normalizing an inverse number 1/Z of the depth Z, or the like may be adopted instead of directly adopting the disparity d or the depth Z.

A value I obtained by normalizing the disparity d with 8 bits (0 to 255) can be acquired by an Expression (b) as shown below. Note that the number of bits to normalize the disparity d is not limited to 8 bits, and may be other number of bits such as 10 bits and 12 bits.

[Mathematical Formula 1]

$$I = \frac{255 \times (d - D_{min})}{D_{max} - D_{min}} \quad \text{(b)}$$

Note that, in the Expression (b), $D_{max}$ is a maximum value of the disparity d, and $D_{min}$ is a minimum value of the disparity d. The maximum value $D_{max}$ and the minimum value $D_{min}$ may be set per screen or may be set for every plural screens.

Further, the value y obtained by normalizing the inverse number 1/Z of the depth Z with 8 bits (0 to 255) can be acquired from an Expression (c) shown below. Note that the number of bits to normalize the inverse number 1/Z of the depth Z is not limited to 8 bits, and may be other number of bits such as 10 bits and 12 bits.

[Mathematical Formula 2]

$$y = 255 \times \frac{\frac{1}{Z} - \frac{1}{Z_{far}}}{\frac{1}{Z_{near}} - \frac{1}{Z_{far}}} \quad \text{(c)}$$

In the Expression (c), $Z_{far}$ is a maximum value of the depth Z, and $Z_{near}$ is a minimum value of the depth Z. The maximum value $Z_{far}$ and the minimum value $Z_{near}$ may be set per screen, or may be set for every plural screens.

Further, YUV420, YUV400, or the like may be adopted as a color format of the depth image. Of course, other kinds of color format may be adopted, too.

According to the present technology, the focus position, aperture value, etc. can be reset after photographing the object. Therefore, an object image having high image quality can be obtained even in the case where the image is blurred, a depth of field is incorrectly set, or the like.

Further, an image same as an image photographed by many interchangeable lenses can be obtained after execution of photographing without carrying a heavy and voluminous interchangeable lens. Moreover, high image quality photographing same as photographing executed by a large-scale imaging device including a large lens, etc. can be executed even by a compact, lightweight, thin imaging device.

While the embodiments according to the present technology has been described, the present technology is not limited the above-described embodiments, and obviously various modifications may be made within a range without departing from the gist of the present technology.

For example, according to the above embodiments, the resolution of an entire area of the viewpoint image at the central viewpoint or the peripheral viewpoint used for the stereo matching is converted in the interpolation processing unit 33. However, it is possible to convert the resolution of only a region corresponding to an edge region (window) for which a phase difference is calculated. In this case also, the same functions and effects can be also obtained.

According to the above embodiments, the object image is reconstructed by using the interpolation image, but a three dimensional (3D) image may be generated by using the interpolation image.

Further, according to the above embodiments, the viewpoint interpolation processing and the development processing are executed in the server 504, but may be executed in the network terminal 502.

Furthermore, according to the above embodiments, the disparity map having the first resolution is used to generate the interpolation image, but the disparity having the second resolution may be used to generate the interpolation image.

Additionally, the camera module 21 at the peripheral viewpoint may be a camera module configured to execute monochromatic photographing, thereby improving the resolution of the viewpoint image at the peripheral viewpoint. In this case, the resolution of the viewpoint image at the central viewpoint and the resolution of the viewpoint image at the peripheral viewpoint become same when the camera module 21 at the central viewpoint is a camera module of a Bayer array and the first resolution is twice the height and width of the second resolution. As a result, the disparity map can be generated with high accuracy.

Also, the first resolution and the second resolution may be set such that the sampling frequency of the viewpoint image at the central viewpoint differs from that of the viewpoint image at the peripheral viewpoint. In this case, it is possible to prevent moire from being generated simultaneously in the viewpoint image at the central viewpoint and the viewpoint image at the peripheral viewpoint.

Further, according to the above embodiments, the disparity map is used for the interpolation processing, but may be used for object trimming processing. In this case, the desired object can be accurately trimmed from the viewpoint image by generating the disparity map with high accuracy.

Note that in the present specification, the system stands for a group that includes a plurality of constituent elements (devices, modules (parts), etc.) regardless whether all of the constituent elements are located in a same housing. Therefore, any of a plurality of devices connected via a network and housed in different housings and a device including a plurality of modules located in a housing is the system.

Further, the present technology may adopt the following configurations.

(1)

An image processing device, including:

a resolution conversion unit configured to convert a resolution of one viewpoint image out of a first viewpoint image imaged at a first resolution and a second viewpoint image imaged at a second resolution which is lower than the first resolution to the resolution of the other viewpoint image, and generate the first viewpoint image and the second viewpoint image both having a same resolution; and a generation unit configured to generate a disparity map based on a correlation value between the first viewpoint image and the second viewpoint image both having the same resolution and generated by the resolution conversion unit.

(2)

The image processing device recited in above (1), wherein the resolution conversion unit converts the resolution of the first viewpoint image to the second resolution, and the generation unit generates the disparity map having the second resolution based on a correlation value between the first viewpoint image and the second viewpoint image having the second resolution and generated by the resolution conversion unit.

(3)

The image processing device recited in above (2), wherein the generation unit converts the resolution of the disparity map to the first resolution.

(4)

The image processing device recited in above (3), wherein the generation unit converts the resolution of the disparity map to the first resolution based on the first viewpoint image having the first resolution.

(5)

The image processing device recited in above (4), wherein the generation unit determines a pixel value of the disparity map of a target pixel based on a pixel value difference of the first viewpoint image having the first resolution between the target pixel and an adjacent pixel adjacent to the target pixel, and the target pixel is a pixel having the first resolution and is an edge region of the first viewpoint image having the first resolution but is not an edge region of the first viewpoint image having the second resolution.

(6)

The image processing device recited in above (1), wherein the resolution conversion unit converts the resolution of the second viewpoint image to the first resolution, and the generation unit generates the disparity map having the first resolution based on a correlation value between the first viewpoint image and the second viewpoint image having the first resolution and generated by the resolution conversion unit.

(7)

The image processing device recited in any one of above (1) to (6), further including:

an interpolation processing unit configured to generate an interpolation image at a viewpoint between viewpoints corresponding to the first viewpoint image and the second viewpoint image based on the disparity map generated by the generation unit and the first viewpoint image; and a development processing unit configured to generate an image virtually imaged by an optical system by using the first viewpoint image, the second viewpoint image, the interpolation image, and a parameter specifying the optical system.

(8)

An image processing method, including steps of:

converting resolution of one viewpoint image out of a first viewpoint image imaged at a first resolution and a second viewpoint image imaged at a second resolution which is lower than the first resolution to the resolution of the other viewpoint image, and generating the first viewpoint image and the second viewpoint image both having a same resolution; and generating a disparity map based on a correlation value between the first viewpoint image and the second viewpoint image both having the same resolution generated by processing in the step of converting the resolution.

(9)

An information processing device, including:

an imaging unit including a first imaging element configured to image a first viewpoint image having a first resolution, and a second imaging element configured to image a second viewpoint image having a second resolution which is lower than the first resolution;

a resolution conversion unit configured to convert a resolution of one viewpoint image out of the first viewpoint image imaged by the first imaging element and the second viewpoint image imaged by the second imaging element to the resolution of the other viewpoint image, and generate the first viewpoint image and the second viewpoint image both having a same resolution; and a generation unit configured to generate a disparity map based on a correlation value between the first viewpoint image and the second viewpoint image both having the same resolution and generated by the resolution conversion unit.

(10)

The information processing device recited in above (9), wherein the second imaging element is disposed in a periphery of the first imaging element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

11 Imaging unit
21 Camera module
30 Image processing unit
31 Resolution conversion unit
32 Correlation value calculation unit
33 Interpolation processing unit
34 Development processing unit
450 Image processing unit
451 Resolution conversion unit
452 Correlation value calculation unit
500 System
501 Imaging device
504 Server

The invention claimed is:

1. An image processing device, comprising:
a central processing unit (CPU) configured to:
convert a first resolution of one viewpoint image out of a first viewpoint image imaged at the first resolution to a second resolution at which a second viewpoint image is imaged, or convert the second resolution of the second viewpoint image to the first resolution, such that the first viewpoint image and the second viewpoint image have same resolution, wherein the second resolution is lower than the first resolution;
generate a disparity map based on a correlation value between the first viewpoint image and the second viewpoint image that have the same resolution; and
determine a pixel value of the disparity map of a target pixel based on a pixel value difference, of the first viewpoint image that has the first resolution, between the target pixel and an adjacent pixel that is adjacent to the target pixel,
wherein the target pixel is a pixel that has the first resolution and is an edge region of the first viewpoint image that has the first resolution, which is other than an edge region of the first viewpoint image that has the second resolution.

2. The image processing device according to claim 1, wherein
in response to the conversion of the first resolution of the first viewpoint image to the second resolution
the CPU is configured to generate the disparity map that has the second resolution based on the correlation value between the first viewpoint image and the second viewpoint image that have the same resolution.

3. The image processing device according to claim 1, wherein the CPU is configured to convert the second resolution of the disparity map to the first resolution.

4. The image processing device according to claim 1, wherein the CPU is configured to convert the second resolution of the disparity map to the first resolution based on the first viewpoint image that has the first resolution.

5. The image processing device according to claim 1, wherein
in response to the conversion of the second resolution of the second viewpoint image to the first resolution
the CPU is configured to generate the disparity map that has the first resolution based on the correlation value between the first viewpoint image and the second viewpoint image that have the same resolution.

6. The image processing device according to claim 1, wherein the CPU is configured to:
generate an interpolation image at a viewpoint between viewpoints corresponding to the first viewpoint image and the second viewpoint image based on the disparity map and the first viewpoint image; and
generate an image virtually imaged by an optical system based on the first viewpoint image, the second viewpoint image, the interpolation image, and a parameter that specifies the optical system.

7. An image processing method, comprising:
converting a first resolution of one viewpoint image out of a first viewpoint image imaged at the first resolution to a second resolution at which a second viewpoint image is imaged, or convert the second resolution of the second viewpoint image to the first resolution, such that the first viewpoint image and the second viewpoint image both having a same resolution, wherein the second resolution is lower than the first resolution;
generating a disparity map based on a correlation value between the first viewpoint image and the second viewpoint image both having the same resolution; and
determining a pixel value of the disparity map of a target pixel based on a pixel value difference, of the first viewpoint image that has the first resolution, between the target pixel and an adjacent pixel that is adjacent to the target pixel,
wherein the target pixel is a pixel that has the first resolution and is an edge region of the first viewpoint image that has the first resolution, which is other than an edge region of the first viewpoint image that has the second resolution.

8. An information processing device, comprising:
an imaging unit that includes a first imaging element configured to image a first viewpoint image that has a first resolution, and a second imaging element configured to image a second viewpoint image that has a second resolution which is lower than the first resolution; and
a central processing unit (CPU) configured to:
convert the first resolution of one viewpoint image out of the first viewpoint image imaged by the first imaging element to the second resolution at which the second viewpoint image is imaged by the second imaging element, or convert the second resolution to the first resolution such that the first viewpoint image and the second viewpoint image have a same resolution; and
generate a disparity map based on a correlation value between the first viewpoint image and the second viewpoint image that have the same resolution; and
determine a pixel value of the disparity map of a target pixel based on a pixel value difference, of the first viewpoint image that has the first resolution, between the target pixel and an adjacent pixel that is adjacent to the target pixel,
wherein the target pixel is a pixel that has the first resolution and is an edge region of the first viewpoint image that has the first resolution, which is other than an edge region of the first viewpoint image that has the second resolution.

9. The information processing device according to claim 8, wherein the second imaging element is disposed in a periphery of the first imaging element.

* * * * *